United States Patent
Hutchinson et al.

(10) Patent No.: US 7,010,961 B2
(45) Date of Patent: Mar. 14, 2006

(54) POWER HEAD SECONDARY CONTAINMENT LEAK PREVENTION AND DETECTION SYSTEM AND METHOD

(75) Inventors: Ray J. Hutchinson, Houma, LA (US); Donald D. Halla, Southington, CT (US); Richard G. Dolson, Canton, CT (US); Robert P. Hart, East Hampton, CT (US); Richard K. Lucas, Enfield, CT (US); Kent D. Reid, Canton, CT (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 10/774,749

(22) Filed: Feb. 9, 2004

(65) Prior Publication Data

US 2004/0261503 A1    Dec. 30, 2004

Related U.S. Application Data

(63) Continuation-in-part of application No. 10/703,156, filed on Nov. 6, 2003, which is a continuation-in-part of application No. 10/430,890, filed on May 6, 2003, which is a continuation-in-part of application No. 10/238,822, filed on Sep. 10, 2002.

(51) Int. Cl.
  *G01M 3/32*  (2006.01)
(52) U.S. Cl. .................. 73/40.5 R; 73/40; 73/49.2; 417/63
(58) Field of Classification Search .............. 73/40, 73/40.5 R, 49.2; 285/93; 417/63
  See application file for complete search history.

(56) References Cited

U.S. PATENT DOCUMENTS

| | | | |
|---|---|---|---|
| 2,821,993 A | 2/1958 | Pacey et al. | |
| 2,941,147 A | 6/1960 | Mckinlay Jr. | |
| 2,947,147 A | 8/1960 | Johnson | |
| 3,183,723 A | 5/1965 | Deters | 73/40.5 R |
| 3,848,765 A | 11/1974 | Durkop | |
| 3,995,472 A | 12/1976 | Murray | |
| 4,088,987 A | 5/1978 | Resler et al. | 340/242 |
| 4,523,454 A | 6/1985 | Sharp | |
| 4,644,780 A | 2/1987 | Jeter | |
| 4,653,312 A | 3/1987 | Sharp | |
| 4,672,366 A | 6/1987 | Butts | |
| 4,676,093 A | 6/1987 | Pugnale et al. | |
| 4,708,015 A | 11/1987 | Sharp | |
| 4,723,441 A | 2/1988 | Sweeney | |
| 4,805,444 A | 2/1989 | Webb | |
| 4,863,710 A | 9/1989 | Rule et al. | |
| 4,971,477 A | 11/1990 | Webb et al. | |

(Continued)

FOREIGN PATENT DOCUMENTS

DE          1258678         1/1968

(Continued)

OTHER PUBLICATIONS

Website, "Red Jacket—Quantum," www.redjacket.com/quantum.htm, printed May 27, 2003.

(Continued)

*Primary Examiner*—Daniel S. Larkin
(74) *Attorney, Agent, or Firm*—Withrow & Terranova, PLLC

(57) ABSTRACT

A submersible turbine pump includes a power head enclosed in a casing. A vacuum source associated with the submersible turbine pump draws a vacuum in the interior space of the casing. A pressure sensor may be used to monitor the vacuum in the interior space to detect a leak in the power head or the casing. If a leak is detected, an alarm may be generated and the submersible turbine pump may be deactivated.

24 Claims, 19 Drawing Sheets

U.S. PATENT DOCUMENTS

| | | | |
|---|---|---|---|
| 5,018,864 A | 5/1991 | Richert | |
| 5,042,290 A | 8/1991 | Geisinger | |
| 5,072,623 A | 12/1991 | Hendershot | |
| 5,081,864 A | 1/1992 | Zaim | |
| 5,098,221 A | 3/1992 | Osborne | |
| 5,115,936 A | 5/1992 | Bartlow | |
| 5,117,677 A | 6/1992 | Hendershot et al. | |
| 5,135,324 A | 8/1992 | Bravo | |
| 5,158,207 A | 10/1992 | Van Daele | 222/52 |
| 5,184,504 A | 2/1993 | Spring | |
| 5,263,794 A | 11/1993 | Webb | |
| 5,265,652 A | 11/1993 | Brunella | |
| 5,297,896 A | 3/1994 | Webb | |
| 5,301,721 A | 4/1994 | Hartmann | |
| 5,343,191 A | 8/1994 | McAtamney | |
| 5,398,976 A | 3/1995 | Webb | |
| 5,400,646 A | 3/1995 | Kraus et al. | |
| 5,408,420 A | 4/1995 | Slocum et al. | |
| 5,440,918 A | 8/1995 | Oster | |
| 5,527,130 A | 6/1996 | Webb | |
| 5,586,586 A | 12/1996 | Fiech | |
| 5,713,607 A | 2/1998 | Webb | |
| 5,722,699 A | 3/1998 | Brancher | |
| 5,746,454 A | 5/1998 | Webb | |
| 5,782,275 A | 7/1998 | Hartsell, Jr. et al. | |
| 5,831,149 A | 11/1998 | Webb | |
| 5,911,155 A | 6/1999 | Webb | |
| 5,927,762 A | 7/1999 | Webb | |
| 5,955,657 A | 9/1999 | Bravo | |
| 5,975,110 A | 11/1999 | Sharp | |
| 5,975,132 A | 11/1999 | Gleeson | |
| 6,029,505 A | 2/2000 | Webb | |
| 6,032,699 A | 3/2000 | Cochran et al. | |
| 6,067,527 A | 5/2000 | Lovell et al. | |
| 6,070,760 A | 6/2000 | Kenney et al. | |
| 6,116,815 A | 9/2000 | Chen | |
| 6,126,409 A | 10/2000 | Young | |
| 6,223,765 B1 | 5/2001 | Small et al. | |
| 6,489,894 B1 | 12/2002 | Berg | |
| 6,523,581 B1 | 2/2003 | Pendleton et al. | |
| 2002/0044060 A1 | 4/2002 | Berg | |
| 2004/0234338 A1 | 11/2004 | Monroe et al. | |

FOREIGN PATENT DOCUMENTS

| | | |
|---|---|---|
| DE | 2900960 | 7/1979 |
| EP | 0931761 A1 | 1/1999 |
| EP | 1179505 A1 | 2/2002 |
| JP | 2000-274378 | * 10/2000 |
| WO | WO 86/07446 | 12/1986 |

OTHER PUBLICATIONS

Website, "Veeder-Root—Interstitial Steel Tanks," www.v-eeder-root.com/dynamic/index.cfm?pageID=175, printed May 27, 2003.

* cited by examiner

POWER HEAD SECONDARY CONTAINMENT LEAK PREVENTION AND DETECTION SYSTEM AND METHOD

RELATED APPLICATIONS

This patent application is a continuation-in-part application of patent application Ser. No. 10/703,156, filed on Nov. 6, 2003, which is a continuation-in-part application of patent application Ser. No. 10/430,890, filed on May 6, 2003, which is a continuation-in-part of patent application Ser. No. 10/238,822, filed on Sep. 10, 2002, all of which are hereby incorporated by reference in their entireties.

Patent application Ser. No. 10/390,346 entitled "Fuel Storage Tank Leak Prevention and Detection System and Method," filed on Mar. 17, 2003, now U.S. Pat. No. 6,834,534, and including the same inventors as included in the present application is related to the present application and is also incorporated herein by reference in its entirety.

FIELD OF THE INVENTION

The present invention relates to detection of a leak or breach in the secondary containment of a power head associated with a submersible turbine pump used in a fuel dispensing environment.

BACKGROUND OF THE INVENTION

In service station environments, fuel is delivered to fuel dispensers from underground storage tanks (UST), sometimes referred to as fuel storage tanks. USTs are large containers located beneath the ground that contain fuel. A separate UST is provided for each fuel type, such as low octane gasoline, high octane gasoline, and diesel fuel. In order to deliver the fuel from the USTs to the fuel dispensers, a submersible turbine pump (STP) is provided that pumps the fuel out of the UST and delivers the fuel through a main fuel piping conduit that runs beneath the ground in the service station.

Due to regulatory requirements governing service stations, the main fuel piping conduit is usually required to be double-walled piping. Double-walled piping contains an inner space that carries the fuel. An outer annular space, also called an "interstitial space," surrounds the inner space so as to capture and contain any leaks that occur in the inner space, so that such leaks do not reach the ground. An example of a double-walled fuel pipe is disclosed in U.S. Pat. No. 5,527,130, incorporated herein by reference in its entirety.

It is possible that the outer annular space of the double-walled fuel piping could fail, thereby leaking fuel outside of the fuel piping if the inner space were to fail as well. Fuel sump sensors that detect leaks are located underneath the ground in the STP sump and the fuel dispenser sumps. These sensors detect any leaks that occur in the fuel piping at the location of the sensors. However, if a leak occurs in the double-walled fuel piping between these sensors, it is possible that a leak in the double-walled fuel piping will go undetected since the leaked fuel will leak into the ground, never reaching one of the fuel leak sensors. The STP will continue to operate as normal, drawing fuel from the UST; however, the fuel may leak to the ground instead of being delivered to the fuel dispensers.

Therefore, there exists a need to be able to monitor the double-walled fuel piping to determine if there is a leak or breach in the outer wall. Detection of a leak or breach in the outer wall of the double-walled fuel piping can be used to generate an alarm or other measure so that preventive measures can be taken to correct the leak or breach in the outer wall of the double-walled piping before a leak in the inner piping can escape to the ground.

Recent proposed changes in state and federal regulations will tighten the requirements to contain leaks and will further require better leak detection so that environmental damage may be minimized. As a result, it is becoming imperative that all potential leak sources be evaluated and steps taken to detect and contain leaks in the piping systems. One area that has not been specifically addressed by the parent disclosures is within the casing that houses the power head associated with a submersible turbine pump.

SUMMARY OF THE INVENTION

The parent disclosures relate to a sensing unit and a tank monitor that monitors the vacuum level in the outer annular space of the double-walled fuel piping to determine if a breach or leak exists in the outer wall of the fuel piping. If the outer annular space cannot maintain a pressure or vacuum level over a given amount of time after being pressurized, this is indicative that the outer wall of the fuel piping contains a breach or leak. If the inner conduit of the fuel piping were to incur a breach or leak such that fuel reaches the outer annular space of the fuel piping, this same fuel would also have the potential to reach the ground through the breach in the outer wall in the fuel piping.

A sensing unit is provided that is communicatively coupled to a tank monitor or other control system. The sensing unit contains a pressure sensor that is coupled to vacuum tubing. The vacuum tubing is coupled to the outer annular space of the fuel piping, and is also coupled to a power head associated with a submersible turbine pump (STP) so that the power head can be used as a vacuum source to generate a vacuum level in the vacuum tubing and the outer annular space. The sensing unit and/or tank monitor determines if there is a leak or breach in the outer annular space by generating a vacuum in the outer annular space using the vacuum source of the power head. Subsequently, the outer annular space is monitored using a pressure sensor to determine if the vacuum level changes significantly to indicate a leak. The system checks for both catastrophic and precision leaks.

In one leak detection embodiment of the present invention, the power head provides a vacuum source to the vacuum tubing and the outer annular space of the fuel piping. The tank monitor receives the vacuum level of the outer annular space via the measurements from the pressure sensor and the sensing unit. After the vacuum level in the outer annular space reaches a defined initial threshold vacuum level, the vacuum of the power head is deactivated and isolated from the outer annular space. The vacuum level of the outer annular space is monitored. If the vacuum level decays to a catastrophic threshold vacuum level, the vacuum of the power head is activated to restore the vacuum level. If the power head cannot restore the vacuum level to the defined initial threshold vacuum level in a defined amount of time, a catastrophic leak detection alarm is generated and the STP is shut down.

If the vacuum level in the outer annular space is restored to the defined initial threshold vacuum level within a defined period of time, a precision leak detection test is performed. The sensing unit monitors the vacuum level in the outer annular space to determine if the vacuum level decays to a precision threshold vacuum level within a defined period of time, in which case a precision leak detection alarm is generated, and the STP may be shut down.

Once a catastrophic leak or precision leak detection alarm is generated, service personnel are typically dispatched to determine if a leak really exists, and if so, to take corrective measures. Tests are conducted to determine if the leak exists in the vacuum tubing, in the sensing unit, or in the outer annular space.

The sensing unit also contains a liquid detection conduit. A liquid detection sensor is placed inside the liquid detection conduit, which may be located at the bottom of the liquid detection conduit, so that any liquid leaks captured in the outer annular space of the fuel piping are stored and detected. The sensing unit and tank monitor can detect liquid in the sensing unit at certain times or at all times. If a liquid leak is detected by the tank monitor, the tank monitor will shut down the STP if so programmed.

The tank monitor may be communicatively coupled to a site controller and/or remote system to communicate leak detection alarms and other information obtained by the sensing unit. The site controller may pass information from the tank monitor onward to a remote system, and the tank monitor may communicate such information directly to a remote system.

Another parent disclosure extended the functionality of the other parent applications by extending the vacuum generation and pressure sensing to the riser pipe that connects the power head to the underground storage tank. The riser pipe is a double-walled pipe and the vacuum of the power head, along with the sensing system described above, are used to monitor the interstitial space of the riser pipe.

The present invention takes the parent disclosures one step further. Specifically, the power head may be contained within a casing. The present invention creates a vacuum in the space between the power head and the casing (also called the interior space of the casing). This vacuum may be created by the power head and a sensing unit as previously described may be used to monitor the vacuum levels in the interior space of the casing. In particular, the interior space of the casing is isolated from other interstitial spaces and monitored in isolation. If a leak is detected, an alarm may be generated and the activity of the STP may be suspended until the leak is isolated and corrected.

Those skilled in the art will appreciate the scope of the present invention and realize additional aspects thereof after reading the following detailed description of the invention in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIGS. 1–15 represent the disclosures made in the parent applications. This background material may be helpful to understand some of the details of the creation of a vacuum in an interstitial space and the sensing that accompanies this vacuum that is used to determine if there is a leak. The discussion of the present invention begins with the discussion of FIG. 16; however, it should be appreciated that the teachings of the sensing element and the algorithms used to detect leaks with the sensing element are applicable to the embodiments introduced in FIG. 16.

Figure 1:
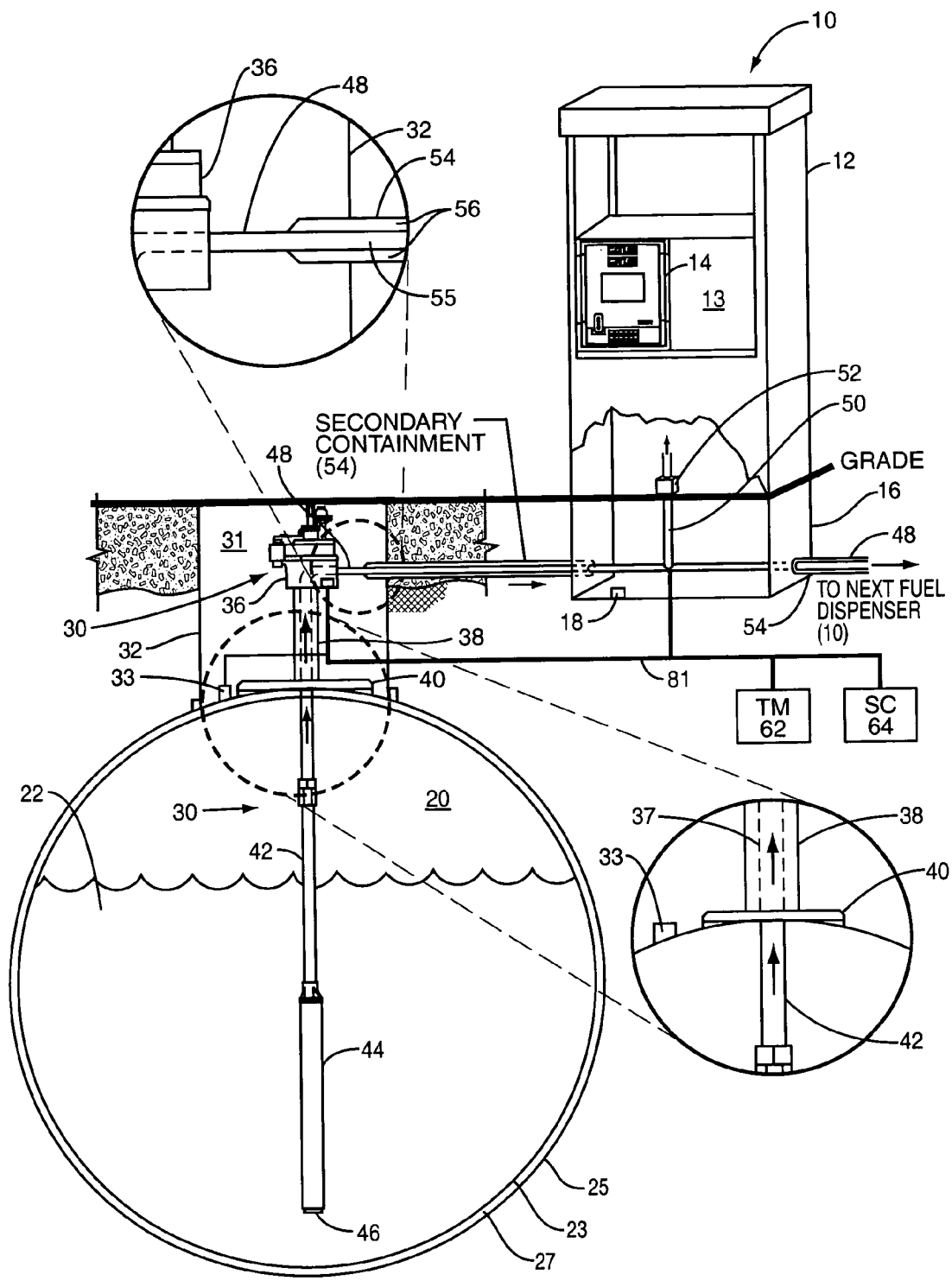
FIG. 1 is an underground storage tank, submersible turbine pump and fuel dispenser system in a service station environment in the prior art.

FIG. 1 illustrates a fuel delivery system known in the prior art for a service station environment. A fuel dispenser 10 is provided that delivers fuel 22 from an underground storage tank (UST) 20 to a vehicle (not shown). The fuel dispenser 10 is comprised of a fuel dispenser housing 12 that typically contains a control system 13 and a display 14. The fuel dispenser 10 contains valves and meters (not shown) to allow fuel 22 to be received from underground piping and delivered through a hose and nozzle (not shown). More information on a typical fuel dispenser 10 can be found in U.S. Pat. No. 5,782,275, assigned to same assignee as the present invention, incorporated herein by reference in its entirety.

The fuel 22 that is dispensed by the fuel dispenser 10 is stored beneath the ground in the UST 20. There may be a plurality of USTs 20 in a service station environment if more than one type of fuel 22 is to be delivered by fuel dispensers 10 in the service station. For example, one UST 20 may contain high octane gasoline, another UST 20 may contain low octane gasoline, and yet another UST 20 may contain diesel fuel. The UST 20 is typically a double-walled tank comprised of an inner vessel 23 that holds the fuel 22 surrounded by an outer casing 25. The outer casing 25 provides an added measure of security to prevent leaked fuel 22 from reaching the ground. Any leaked fuel 22 from a leak in the inner vessel 23 will be captured in an annular space 27 that is formed between the inner vessel 23 and the outer casing 25. This annular space is also called an "interstitial space" 27. More information on USTs 20 in service station environments can be found in U.S. Pat. No. 6,116,815, which is incorporated herein by reference in its entirety.

A submersible turbine pump (STP) 30 is provided to draw the fuel 22 from the UST 20 and deliver the fuel 22 to the fuel dispensers 10. An example of a STP 30 is the Quantum™ manufactured and sold by the Marley Pump Company and disclosed at http://www.redjacket.com/quantum-.htm. Another example of a STP 30 is disclosed in U.S. Pat. No. 6,126,409, incorporated hereby by reference in its entirety. The STP 30 is comprised of a power head 36 that incorporates a vacuum pump and electronics (not shown). Typically, the vacuum pump is a venturi that is created using a portion of the pressurized fuel product, but the STP 30 is not limited to such an embodiment. The power head 36 is fluidly connected to a column pipe 37 which is surrounded by a riser pipe 38 that is mounted using a mount 40 connected to the top of the UST 20. The riser pipe 38 extends downwardly from the power head 36 around the column pipe 37. The column pipe 37 extends down into the UST 20 and is terminated with a boom 42 that is fluidly coupled to the fuel 22.

The boom 42 is coupled to a turbine housing 44 that contains a turbine, also called a "turbine pump" (not shown), both of which terms can be used interchangeably. When one or more fuel dispensers 10 in the service station are activated to dispense fuel 22, the STP 30 electronics are activated to cause the turbine inside the turbine housing 44 to rotate to pump fuel 22 into the turbine housing inlet 46 and into the boom 42. The fuel 22 is drawn through the column pipe 37 in the riser pipe 38 and delivered to the main fuel piping conduit 48. The main fuel piping conduit 48 is coupled to the fuel dispensers 10 in the service station whereby the fuel 22 is delivered to a vehicle (not shown). If the main fuel piping conduit 48 is a double-walled piping, the main fuel piping conduit 48 will have an interstitial space 56 as well to capture any leaked fuel.

Regulatory requirements require that any portion of main fuel piping conduit 48 exposed to the ground be contained within a housing or other structure so that any leaked fuel 22 from the main fuel piping conduit 48 is captured. This secondary containment is provided in the form of a double-walled portion of main fuel piping conduit 48, as illustrated in FIG. 1. The double-walled portion of main fuel piping conduit 48 contains an inner space 55 surrounded by an outer annular space 56 formed by outer wall 54, referred to in the figures as "secondary containment" (the outer annular space 56 is sometimes also called herein the "interstitial space" 56). The terms "outer annular space" and "interstitial space" are well known interchangeable terms to one of ordinary skill in the art. The fuel 22 is carried in the inner space 55. In FIG. 1 and in prior art systems, the outer annular space 56 runs through the sump wall 32 and the inner space 55 terminates once inside the sump wall 32 via clamping. This is because the sump wall 32 provides the secondary containment of the inner space 55 for the portion the main fuel piping conduit 48 inside the sump wall 32.

The power head 36 is typically placed inside a sump 31 so that any leaks that occur in the power head 36 are contained within the sump 31 and are not leaked to the ground. A sump liquid sensor 33 may also be provided inside the sump 31 to detect any such leaks so that the sump 31 can be periodically serviced to remove any leaked fuel. The sump liquid sensor 33 may be communicatively coupled to a tank monitor 62, site controller 64, or other control system via a communication line 81 so that liquid detected in the sump 31 can be communicated to an operator and/or an alarm be generated. An example of a tank monitor 62 is the TLS-350 manufactured by the Veeder-Root Company. An example of a site controller 64 is the G-Site® manufactured by Gilbarco Inc. Note that any type of monitoring device or other type of controller or control system can be used in place of a tank monitor 62 or site controller 64.

The main fuel piping conduit 48, in the form of a double-walled pipe, is run underneath the ground in a horizontal manner to each of the fuel dispensers 10. Each fuel dispenser 10 is placed on top of a fuel dispenser sump 16 that is located beneath the ground underneath the fuel dispenser 10. The fuel dispenser sump 16 captures any leaked fuel 22 that drains from the fuel dispenser 10 and its internal components so that such fuel 22 is not leaked to the ground. The main fuel piping conduit 48 is run into the fuel dispenser sump 16, and a branch conduit 50 is coupled to the main fuel piping conduit 48 to deliver the fuel 22 into each individual fuel dispenser 10. The branch conduit 50 is typically run into a shear valve 52 located proximate to ground level so that any impact to the fuel dispenser 10 causes the shear valve 52 to engage, thereby shutting off the fuel dispenser 10 access to fuel 22 from the branch conduit 50. The main fuel piping conduit 48 exits the fuel dispenser sump 16 so that fuel 22 can be delivered to the next fuel dispenser 10, and so on until a final termination is made. A fuel dispenser sump sensor 18 is typically placed in the fuel dispenser sump 16 so that any leaked fuel from the fuel dispenser 10 or the main fuel piping conduit 48 and/or branch conduit 50 that is inside the fuel dispenser sump 16 can be detected and reported accordingly.

Figure 2:
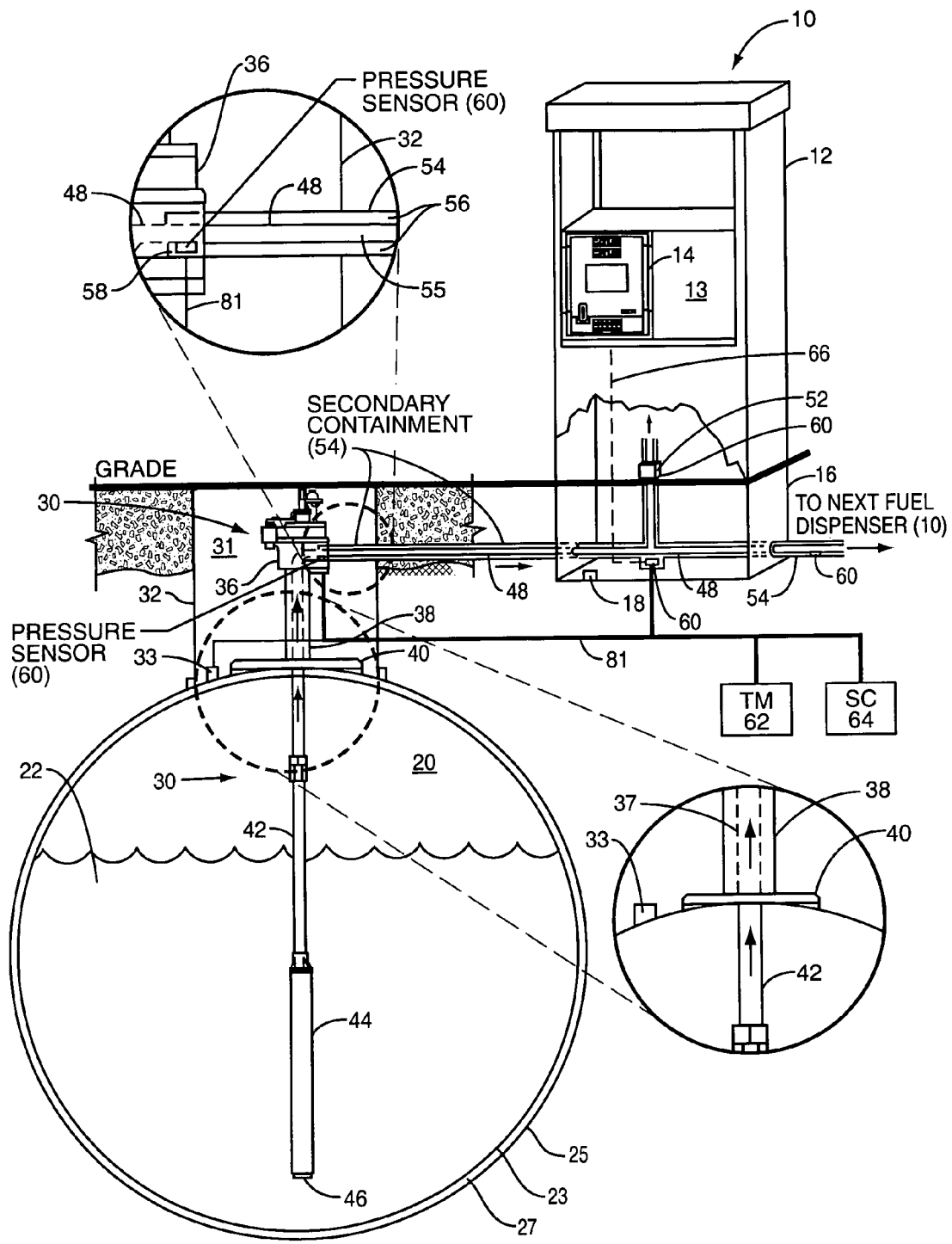
FIG. 2 is a schematic diagram of the outer annular space of the double-walled fuel piping extending into the power head.

FIG. 2 illustrates a fuel delivery system in a service station environment according to one embodiment of the present invention. The outer wall 54 provided by the outer annular space 56 of the main fuel piping conduit 48 is run through the sump 31 and all the way to the power head 36, as illustrated. In this manner, the pressure or vacuum level created by the power head 36 can also be applied to the outer annular space 56 of the main fuel piping conduit 48 to detect leaks via monitoring of the vacuum level in the outer annular space 56, as will be discussed later in this patent application. The terms "pressure" and "vacuum level" are used interchangeably herein. One or more pressure sensors 60 may be placed in the outer annular space 56 in a variety of locations, including but not limited to inside the sump 31, power head 36, and the outer annular space 56 inside the fuel dispenser sump 16.

In the embodiment illustrated in FIG. 2, the outer annular space 56 of the main fuel piping conduit 48 is run inside the power head 36 so that any fuel 22 that has leaked into the outer annular space 56 can be detected by the sump liquid sensor 33 and/or be collected in the sump 31 for later evacuation. By running the outer annular space 56 of the main fuel piping conduit 48 inside the power head 36, it is possible to generate a vacuum level in the outer annular space 56 from the same STP 30 that draws fuel 22 from the UST 20 via the boom 42. Any method of accomplishing this function is contemplated by the present invention. One method may be to use a siphon system in the power head 36 to create a vacuum level in the outer annular space 56, such as the siphon system described in U.S. Pat. No. 6,223,765, assigned to Marley Pump Company and incorporated herein by reference its entirety. Another method is to direct some of the vacuum generated by the STP 30 from inside the boom 42 to the outer annular space 56. The present invention is not limited to any particular method of the STP 30 generating a vacuum level in the outer annular space 56.

Figure 3:
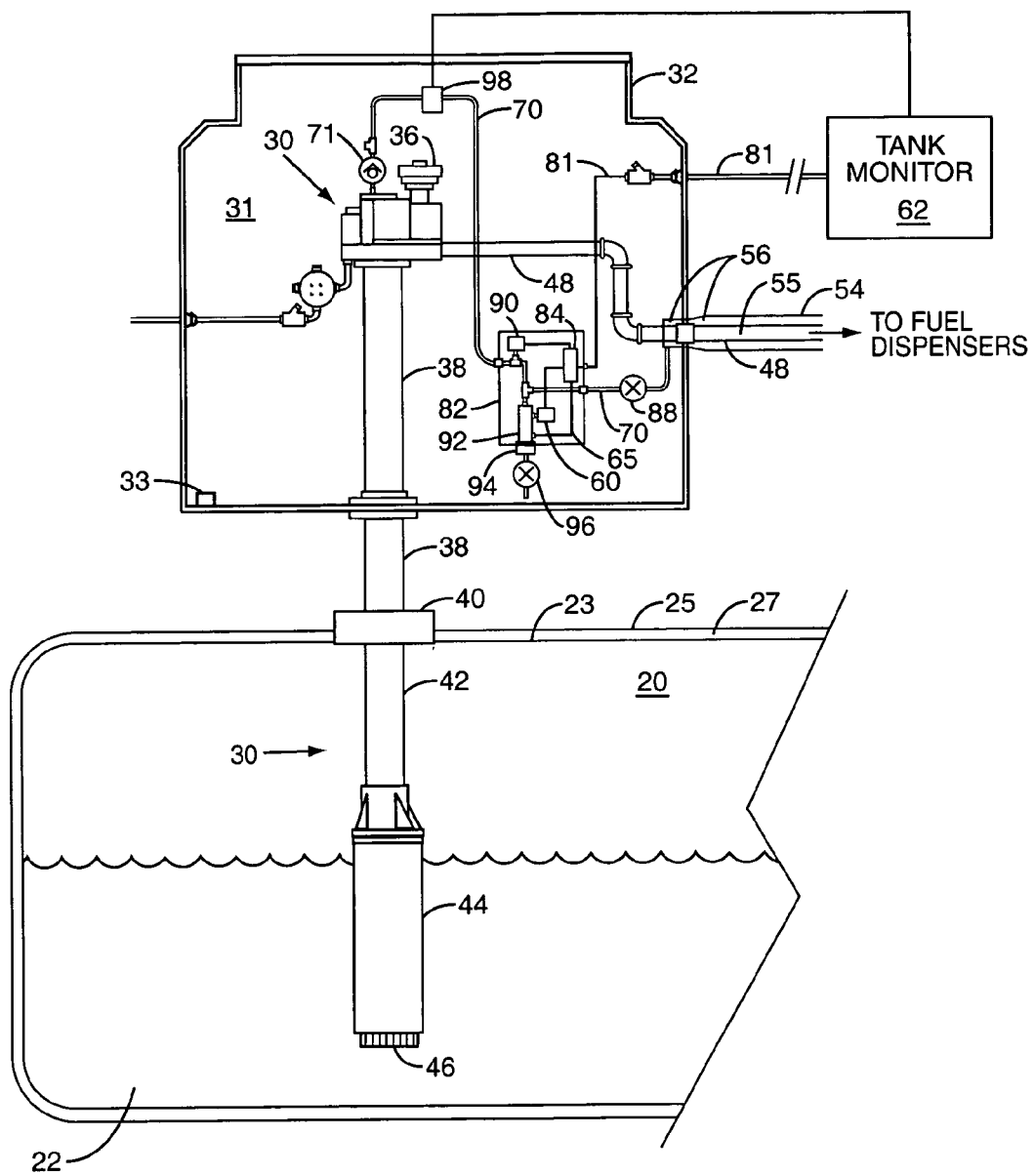
FIG. 3 is a schematic diagram of one embodiment of the sensing components used in the present invention.

FIG. 3 illustrates another embodiment of running the outer annular space 56 of the main fuel piping conduit 48 only into the sump 31 rather than the outer annular space 56 being run with the inner space 55 into the power head 36. A vacuum tubing 70 connects the outer annular space 56 to the power head 36. Again, as discussed for FIG. 2 above, the power head 36 is coupled to the outer annular space 56, such as using direct coupling to the power head 36 (as illustrated in FIG. 2), or using a vacuum tubing 70 (as illustrated in FIG. 3) as a vacuum generating source to create a vacuum level in the outer annular space 56. Whether the configuration of coupling the power head 36 to the outer annular space 56 is accomplished by the embodiment illustrated in FIG. 2, FIG. 3, or other manner, the vacuum level monitoring and liquid leak detection aspects of the present invention described below and with respect to a sensing unit 82 illustrated in FIG. 3 is equally applicable to all embodiments.

FIG. 3 also illustrates a sensing unit 82, which may be provided either inside or outside the sump 31 and/or power head 36, that monitors the vacuum level in the outer annular space 56 of the main fuel piping conduit 48. If the outer annular space 56 cannot maintain a vacuum level over a given period of time after being pressurized, this is indicative that the outer wall 54 contains a breach or leak. In this instance, if the inner space 55 were to incur a breach or leak such that fuel 22 reaches the outer annular space 56, this same fuel 22 would also have the potential to reach the ground through the breach in the outer wall 54. Therefore, it is desirable to know if the outer wall 54 contains a breach or leak when it occurs and before a leak or breach occurs in the inner space 55, if possible, so that appropriate notifications, alarms, and measures can be taken in a preventive manner rather than after a leak of fuel 22 to the ground occurs. It is this aspect of the present invention that is described below.

The sensing unit 82 is comprised of a sensing unit controller 84 that is communicatively coupled to the tank monitor 62 via a communication line 81. The communication line 81 is provided in an intrinsically safe enclosure inside the sump 31 since fuel 22 and or fuel vapor may be present inside the sump 31. The sensing unit controller 84 may be any type of microprocessor, micro-controller, or electronics that is capable of communicating with the tank monitor 62. The sensing unit controller 84 is also electrically coupled to a pressure sensor 60. The pressure sensor 60 is coupled to a vacuum tubing 70. The vacuum tubing 70 is coupled to the power head 36 so that the power head 36 or other portion of the STP 30 can be used as a vacuum source to generate a vacuum level, which may be a positive or negative vacuum level, inside the vacuum tubing 70. The vacuum tubing 70 is also coupled to the outer annular space 56 of the main fuel piping conduit 48. A check valve 71 may be placed inline to the vacuum tubing 70 if it is desired to prevent the STP 30 from ingressing air to the outer annular space 56 of the main fuel piping conduit 48.

An isolation valve 88 may be placed inline with the vacuum tubing 70 between the sensing unit 82 and the outer annular space 56 of the main fuel piping conduit 48 to isolate the sensing unit 82 from the outer annular space 56 for reasons discussed later in this application. A vacuum control valve 90 is also placed inline to the vacuum tubing 70 between the pressure sensor 60 and the power head 36 of the STP 30. The vacuum control valve 90 is electrically coupled to the sensing unit controller 84 and is closed by the sensing unit controller 84 when it is desired to isolate the vacuum source of the STP 30 from the outer annular space 56 during leak detection tests, as will be described in more detail below. The vacuum control valve 90 may be a solenoid-controlled valve or any other type of valve that can be controlled by sensing unit controller 84.

An optional differential pressure indicator 98 may also be placed in the vacuum tubing 70 between the power head 36 of the STP 30 and sensing unit 82 on the power head 36 side of the vacuum control valve 90. The differential pressure indicator 98 may be communicatively coupled to the tank monitor 62. The differential pressure indicator 98 detects whether a sufficient vacuum level is generated in the vacuum tubing 70 by the vacuum source of the STP 30. If the differential pressure indicator 98 detects that a sufficient vacuum level is not generated in the vacuum tubing 70 by the vacuum source of the STP 30, and a leak detection test fails, this may be an indication that a leak has not really occurred in the outer annular space 56. The leak detection may have been a result of the vacuum source of the STP 30 failing to generate a vacuum in the vacuum tubing 70 in some manner. The tank monitor 62 may use information from the differential pressure indicator 98 to discriminate between a true leak and a vacuum level problem with the vacuum source of the STP 30 in an automated fashion. The tank monitor 62 may also generate an alarm if the differential pressure indicator 98 indicates that the vacuum source of the STP 30 is not generating a sufficient vacuum level in the vacuum tubing 70. Further, the tank monitor 62 may first check information from the differential pressure indicator 98 after detecting a leak, but before generating an alarm, to determine if the leak detection is a result of a true leak or a problem with the vacuum level generation by the vacuum source of the STP 30.

In the embodiments further described and illustrated herein, the differential pressure indicator 98 does not affect the tank monitor 62 generating a leak detection alarm. The differential pressure indicator 98 is used as a further information source when diagnosing a leak detection alarm generated by the tank monitor 62. However, the scope of the present invention encompasses use of the differential pressure indicator 98 as both an information source to be used after a leak detection alarm is generated and as part of a process to determine if a leak detection alarm should be generated.

The sensing unit 82 also contains a liquid detection conduit 92. The liquid detection conduit 92 is fluidly coupled to the outer annular space 56. The liquid detection conduit 92 is nothing more than a conduit that can hold liquid and contains a liquid detection sensor 94 so that any liquid that leaks in the outer annular space 56 will be contained and cause the liquid detection sensor 94 to detect a liquid leak, which is then reported to the tank monitor 62. The liquid detection sensor 94 may contain a float (not shown) as is commonly known in one type of liquid detection sensor 94. An example of such a liquid detection sensor 94 that may be used in the present invention is the "Interstitial Sensor for Steel Tanks," sold by Veeder-Root Company and described on the website http://www.veeder-root-.com/dynamic/index.cfm?pageID=175, filed with the Information Disclosure Statement, incorporated herein by reference in its entirety.

The liquid detection sensor 94 is communicatively coupled to the sensing unit controller 84 via a communication line 65. The sensing unit controller 84 can in turn generate an alarm and/or communicate the detection of liquid to the tank monitor 62 to generate an alarm and/or shut down the STP 30. The liquid detection sensor 94 can be located anywhere in the liquid detection conduit 92, but is preferably located at the bottom of the liquid detection conduit 92 at its lowest point so that any liquid in the liquid detection conduit 92 will be pulled towards the liquid detection sensor 94 by gravity. If liquid, such as leaked fuel 22, is present in the outer annular space 56, the liquid will be detected by the liquid detection sensor 94. The tank monitor 62 can detect liquid in the outer annular space 56 at certain times or at all times, as programmed.

If liquid leaks into the liquid detection conduit 92, it will be removed at a later time, typically after a liquid leak detection alarm has been generated, by service personnel using a suction device that is placed inside the liquid detection conduit 92. In an alternative embodiment, a drain valve 96 is placed inline between the liquid detection conduit 92 and the sump 31 that is opened and closed manually. During normal operation, the drain valve 96 is closed, and any liquid collected in the liquid detection conduit 92 rests at the bottom of the liquid detection conduit 92. If liquid is detected by the liquid detection sensor 94 and service personnel are dispatched to the fueling environment, the service personnel can drain the trapped liquid by opening the drain valve 96, and the liquid will drain into the sump 31 for safe keeping and so that the system can again detect new leaks in the sensing unit 82. When it is desired to empty the sump 31, the service personnel can draw the liquid out of the sump 31 using a vacuum or pump device.

Against this backdrop, the functional operation of these components is better explicated. The parent disclosures teach that the present invention is capable of performing two types of leak detections tests: precision and catastrophic. A catastrophic leak is defined as a major leak where a vacuum level in the outer annular space 56 changes very quickly due to a large leak in the outer annular space 56. A precision leak is defined as a leak where the vacuum level in the outer annular space 56 changes less drastically than a vacuum level change for a catastrophic leak.

Figure 4A:
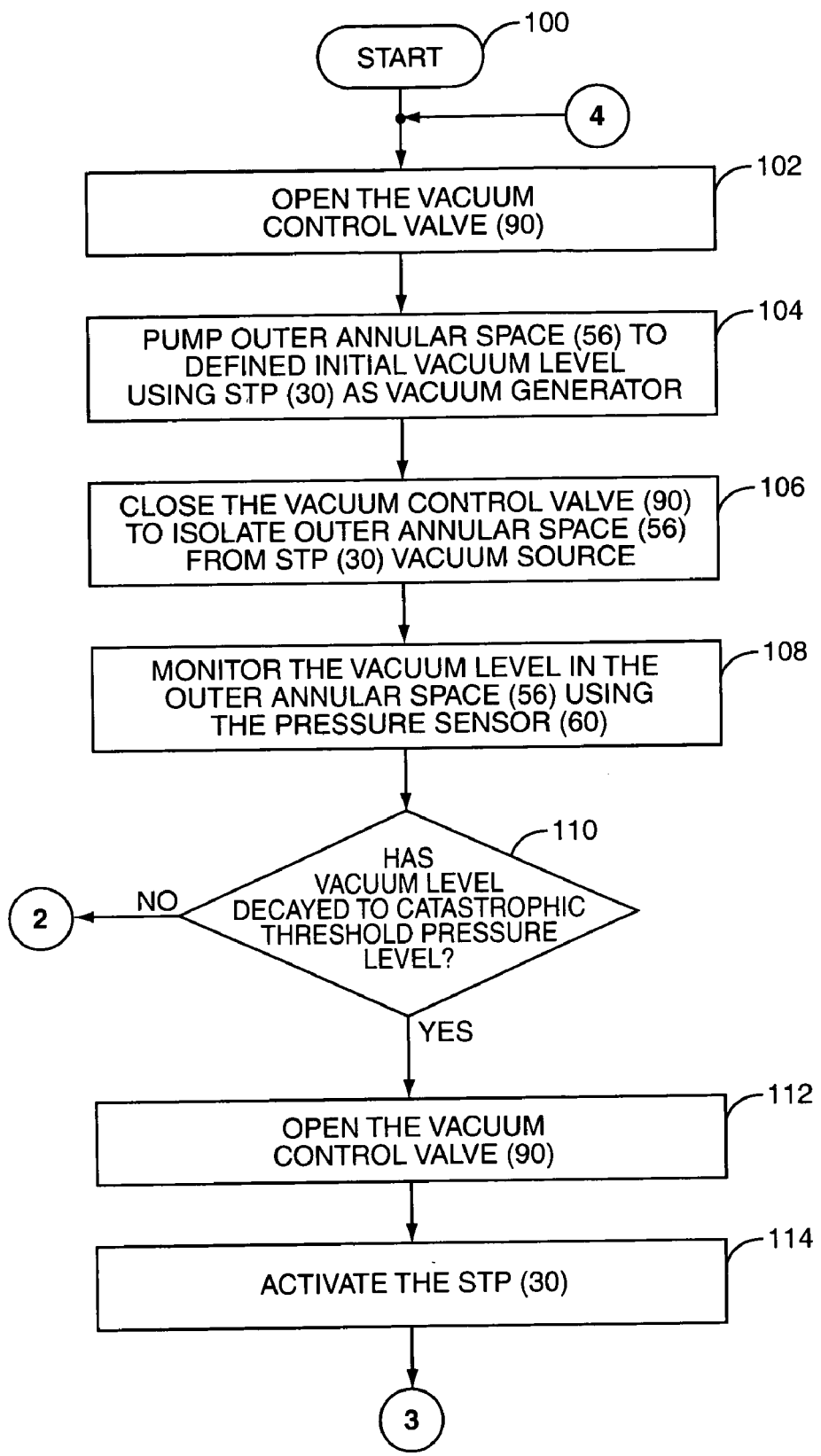
FIGS. 4A and 4B are flowchart diagrams illustrating one embodiment of the leak detection test of the present invention.
Figure 4B:
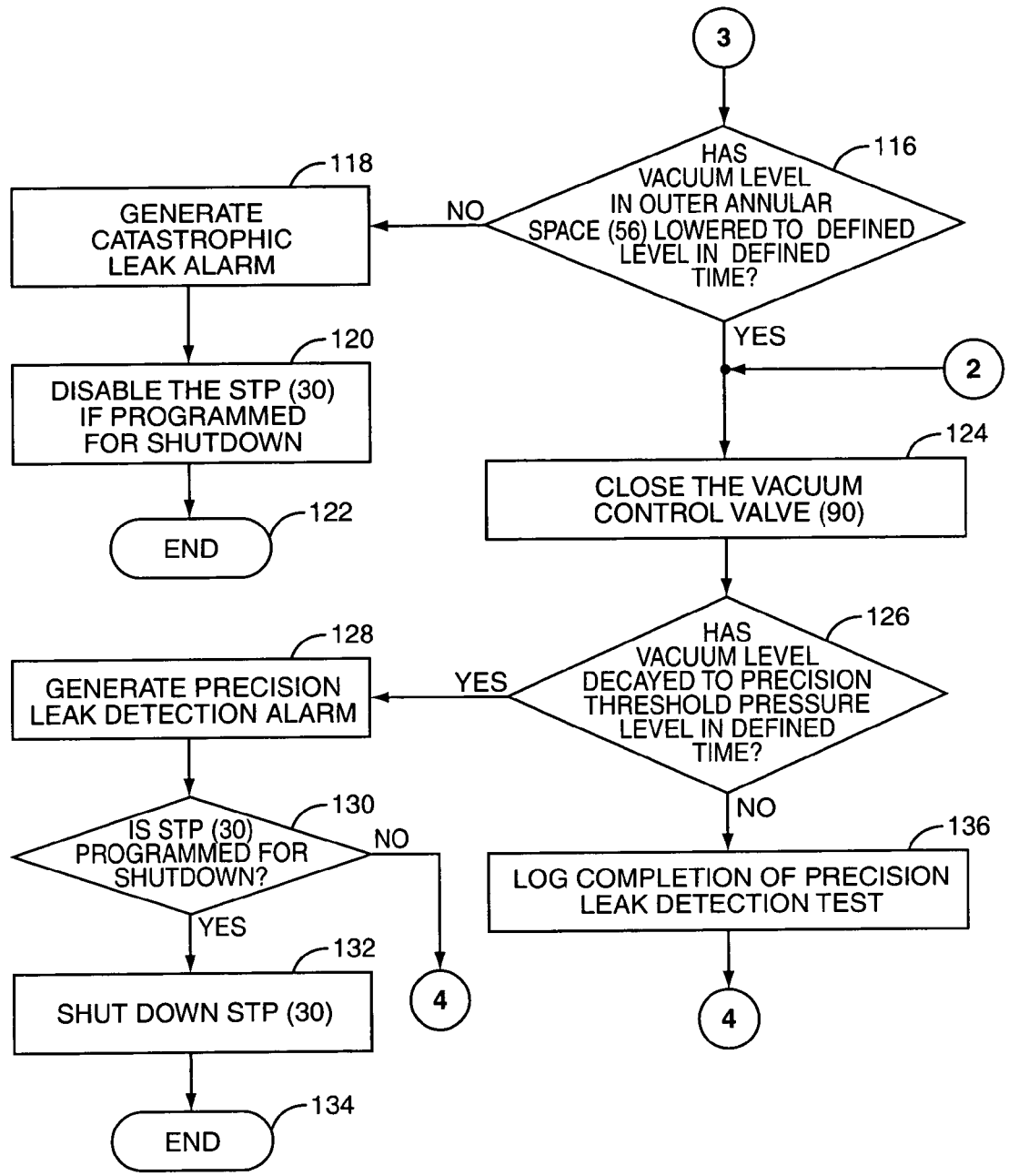

FIGS. 4A and 4B provide a flowchart illustration of the leak detection operation of the sensing unit that, according to one embodiment of the present invention, performs both the catastrophic and precision leak detection tests for the outer wall 54 of the main fuel piping conduit 48. The tank monitor 62 directs the sensing unit 82 to begin a leak detection test to start the process (step 100). Alternatively, a test may be started automatically if the vacuum level reaches a predefined threshold. In response, the sensing unit controller 84 opens the vacuum control valve 90 (step 102) so that the STP 30 is coupled to the outer annular space 56 via the vacuum tubing 70. The STP 30 provides a vacuum source and pumps the air, gas, and/or liquid out of the vacuum tubing 70 and the outer annular space 56, via its coupling to the vacuum tubing 70, after receiving a test initiation signal from the tank monitor 62. The STP 30 pumps the air, gas or liquid out of the outer annular space 56 until a defined initial threshold vacuum level is reached or substantially reached (step 104). The tank monitor 62 receives the vacuum level of the outer annular space 56 via the measurements from the pressure sensor 60 communication to the sensing unit controller 84. This defined initial threshold vacuum level is −15 inches of Hg in one embodiment of the present invention, and may be a programmable vacuum level in the tank monitor 62. Also, note that if the vacuum level in the outer annular space 56 is already at the defined initial threshold vacuum level or substantially close to the defined initial vacuum threshold level sufficient to perform the leak detection test, steps 102 and 104 may be skipped.

After the vacuum level in the vacuum tubing 70 reaches the defined initial threshold vacuum level, as ascertained by monitoring of the pressure sensor 60, the tank monitor 62 directs the sensing unit controller 84 to deactivate the STP 30 (unless the STP 30 has been turned on for fuel dispensing) and to close the vacuum control valve 90 to isolate the outer annular space 56 from the STP 30 (step 106). Next, the tank monitor 62 monitors the vacuum level using vacuum level readings from the pressure sensor 60 via the sensing unit controller 84 (step 108). If the vacuum level decays to a catastrophic threshold vacuum level, which may be −10 inches of Hg in one embodiment of the present invention and also may be programmable in the tank monitor 62, this is an indication that a catastrophic leak may exist (decision 110). The sensing unit 82 opens the vacuum control valve 90 (step 112) and activates the STP 30 (unless the STP 30 is already turned on for fuel dispensing) to attempt to restore the vacuum level back to the defined initial threshold vacuum level (−15 inches of Hg in the specific example) (step 114).

Continuing to FIG. 4B, the tank monitor 62 determines if the vacuum level in the outer annular space 56 has lowered back down to the defined initial threshold vacuum level (−15 inches of Hg in the specific example) within a defined period of time, which is programmable in the tank monitor 62 (decision 116). If not, this is an indication that a major leak exists in the outer wall 54 of the main fuel piping conduit 48 or the vacuum tubing 70, and the tank monitor 62 generates a catastrophic leak detection alarm (step 118). The tank monitor 62, if so programmed, will shut down the STP 30 so that the STP 30 does not pump fuel 22 to fuel dispensers 10 that may leak due to the breach in the outer wall 54 (step 120), and the process ends (step 122). An operator or service personnel can then manually check the integrity of the outer annular space 56, vacuum tubing 70 and/or conduct additional leak detection tests on-site, as desired, before allowing the STP 30 to be operational again. If the vacuum level in the outer annular space 56 does lower back down to the defined initial threshold vacuum level within the defined period of time (decision 116), no leak detection alarm is generated at this point in the process.

Back in decision 110 (shown in FIG. 4A), if the vacuum level did not decay to the defined initial threshold vacuum level (−10 inches of Hg in specific example), this is also an indication that a catastrophic leak does not exist. Either way, if the answer to decision 110 is no, or the answer to decision 116 is yes, the tank monitor 62 goes on to perform a precision leak detection test since no catastrophic leak exists.

For the precision leak detection test, the tank monitor 62 directs the sensing unit controller 84 to close the vacuum control valve 90 if it is not already closed (step 124). Next, the tank monitor 62 determines if the vacuum level in the outer annular space 56 has decayed to a precision threshold vacuum level within a defined period of time, both of which may be programmable (decision 126). If not, the tank monitor 62 logs the precision leak detection test as completed with no alarm (step 136), and the leak detection process restarts again as programmed by the tank monitor 62 (step 100).

If the vacuum level in the outer annular space 56 has decayed to a precision threshold vacuum level within the defined period of time, the tank monitor 62 generates a precision leak detection alarm (step 128). The tank monitor 62 determines if the tank monitor 62 has been programmed to shut down the STP 30 in the event of a precision leak detection alarm (decision 130). If yes, the tank monitor 62 shuts down the STP 30 (step 132), and the process ends (step 134). If not, the STP 30 can continue to operate when fuel dispensers are activated, and the leak detection process restarts again as programmed by the tank monitor 62 (step 100). This is because it may be acceptable to allow the STP 30 to continue to operate if a precision leak detection alarm occurs depending on regulations and procedures. Also, note that both the precision threshold vacuum level and the defined period of time may be programmable at the tank monitor 62 according to levels that are desired to be indicative of a precision leak.

Once a catastrophic leak or precision leak detection alarm is generated, service personnel are typically dispatched to determine if a leak really exists, and if so, to take corrective measures. The service personnel can close the isolation valve 88 between the sensing unit 82 and the outer annular space 56 to isolate the two from each other. The service personnel can then initiate leak tests manually from the tank monitor 62 that operate as illustrated in FIGS. 4A and 4B. If the leak detection tests pass after previously failing and after the isolation valve 88 is closed, this is indicative that some area of the outer annular space 56 contains the leak. If the leak detection tests continue to fail, this is indicative that the leak may be present in the vacuum tubing 70 connecting the sensing unit 82 to the outer annular space 56, or within the vacuum tubing 70 in the sensing unit 82 or the vacuum tubing 70 between sensing unit 82 and the power head 36 of the STP 30. Closing of the isolation valve 88 also allows components of the sensing unit 82 and vacuum tubing 70 to be replaced without relieving the vacuum in the outer annular space 56 since it is not desired to recharge the system vacuum and possibly introduce vapors or liquid into the outer annular space 56 since the outer annular space 56 is under a vacuum and will draw in air or liquid if vented.

Figure 5:
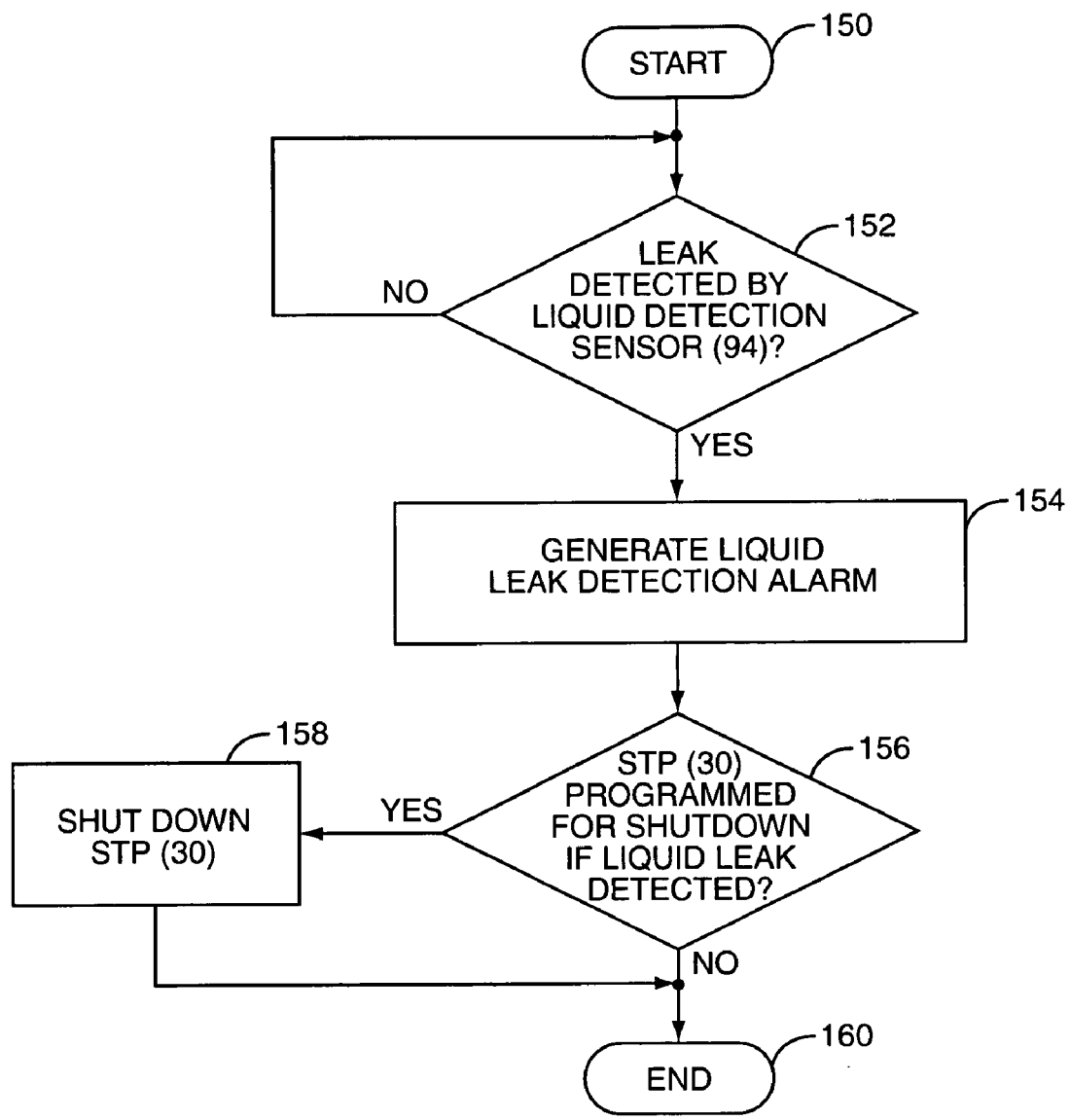
FIG. 5 is a flowchart diagram of a liquid leak detection test for one embodiment of the present invention.

FIG. 5 is a flowchart diagram of a liquid leak detection test performed by the tank monitor 62 to determine if a leak is present in the outer annular space 56. The liquid leak detection test may be performed by the tank monitor 62 on a continuous basis or at periodic times, depending on the programming of the tank monitor 62. Service personnel may also cause the tank monitor 62 to conduct the liquid leak detection test manually.

The process starts (step 150), and the tank monitor 62 determines if a leak has been detected by the liquid detection sensor 94 (decision 152). If not, the tank monitor 62 continues to determine if a leak has been detected by the liquid detection sensor 94 in a continuous fashion. If the tank monitor 62 does determine from the liquid detection sensor 94 that a leak has been detected, the tank monitor 62 generates a liquid leak detection alarm (step 154). If the tank monitor 62 has been programmed to shut down the STP 30 in the event of a liquid leak detection alarm being generated (decision 156), the tank monitor 62 shuts down the STP 30 (if the STP 30 is on for fuel dispensing) (step 158), and the process ends (step 160). If the tank monitor 62 has not been programmed to shut down the STP 30 in the event of a liquid leak detection alarm being generated, the process just ends without taking any action with respect to the STP 30 (step 160).

Figure 6:
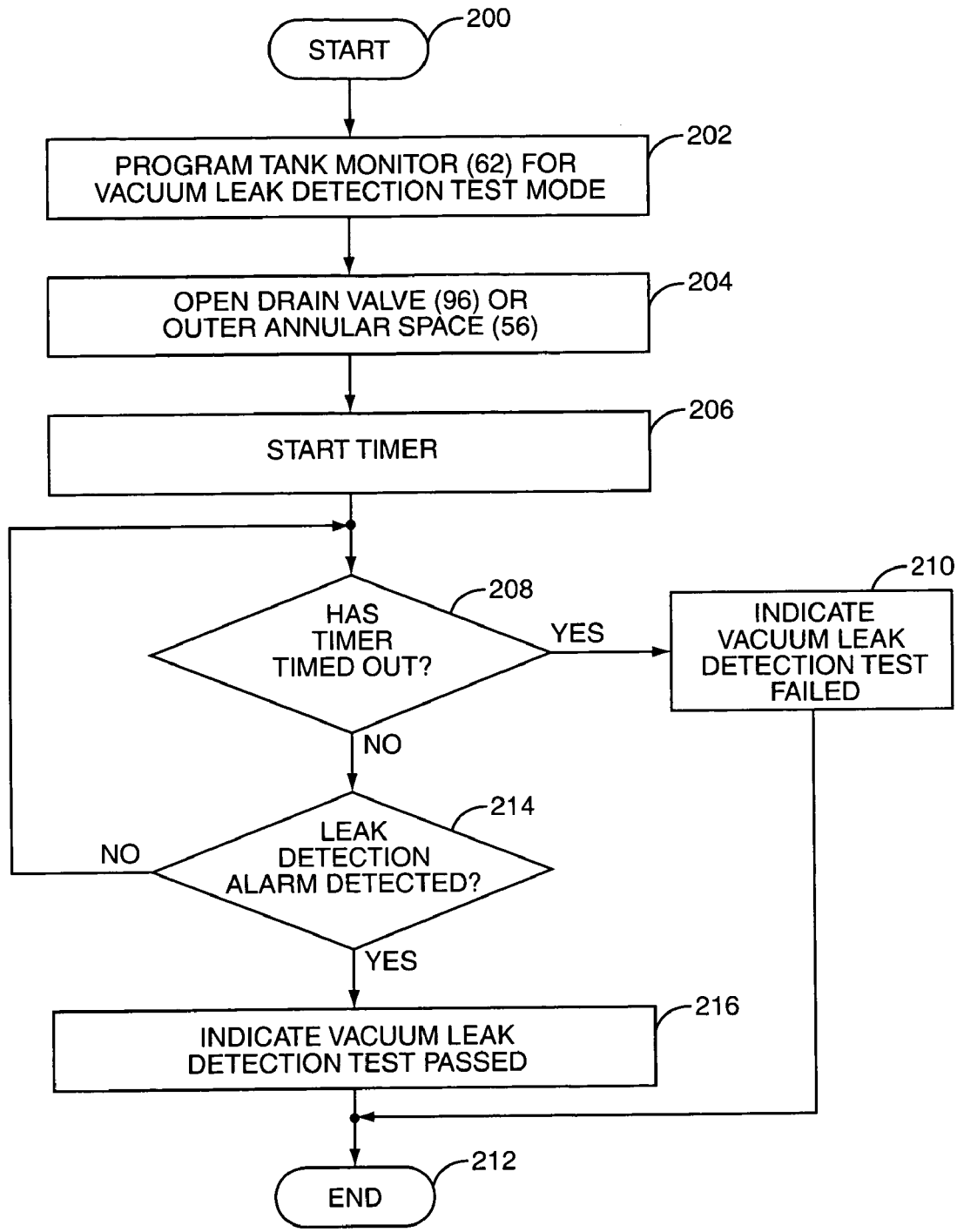
FIG. 6 is a flowchart diagram of a functional vacuum leak detection test for one embodiment of the present invention that is carried out in a tank monitor test mode.

FIG. 6 is a flowchart diagram that discloses a functional vacuum leak detection test performed to determine if the sensing unit 82 can properly detect a purposeful leak. If a leak is introduced into the outer annular space 56, and a leak is not detected by the sensing unit 82 and/or tank monitor 62, this is an indication that some component of the leak detection system is not working properly.

The process starts (step 200), and a service person programs the tank monitor 62 to be placed in a functional vacuum leak detection test mode (step 202). Next, a service person manually opens the drain valve 96 or other valve to provide an opening in the outer annular space 56 or vacuum tubing 70 so that a leak is present in the outer annular space 56 (step 204). The tank monitor 62 starts a timer (step 206) and determines when the timer has timed out (decision 208). If the timer has not timed out, the tank monitor 62 determines if a leak detection alarm has been generated (decision 214). If not, the process continues until the timer times out (decision 208). If a leak detection alarm has been generated, as is expected, the tank monitor 62 indicates that the functional vacuum leak detection test passed and that the leak detection system is working properly (step 216) and the process ends (step 212).

If the timer has timed out without a leak being detected, this is indicative that the functional vacuum leak detection test failed (step 210) and that there is a problem with the system, which could be a component of the sensing unit 82 and/or tank monitor 62. Note that although this functional vacuum leak detection test requires manual intervention to open the drain valve 96 or other valve to place a leak in the outer annular space 56 or vacuum tubing 70, this test could be automated if the drain valve 96 or other valve in the outer annular space 56 or vacuum tubing 70 was able to be opened and closed under control of the sensing unit 82 and/or tank monitor 62.

Figure 7:
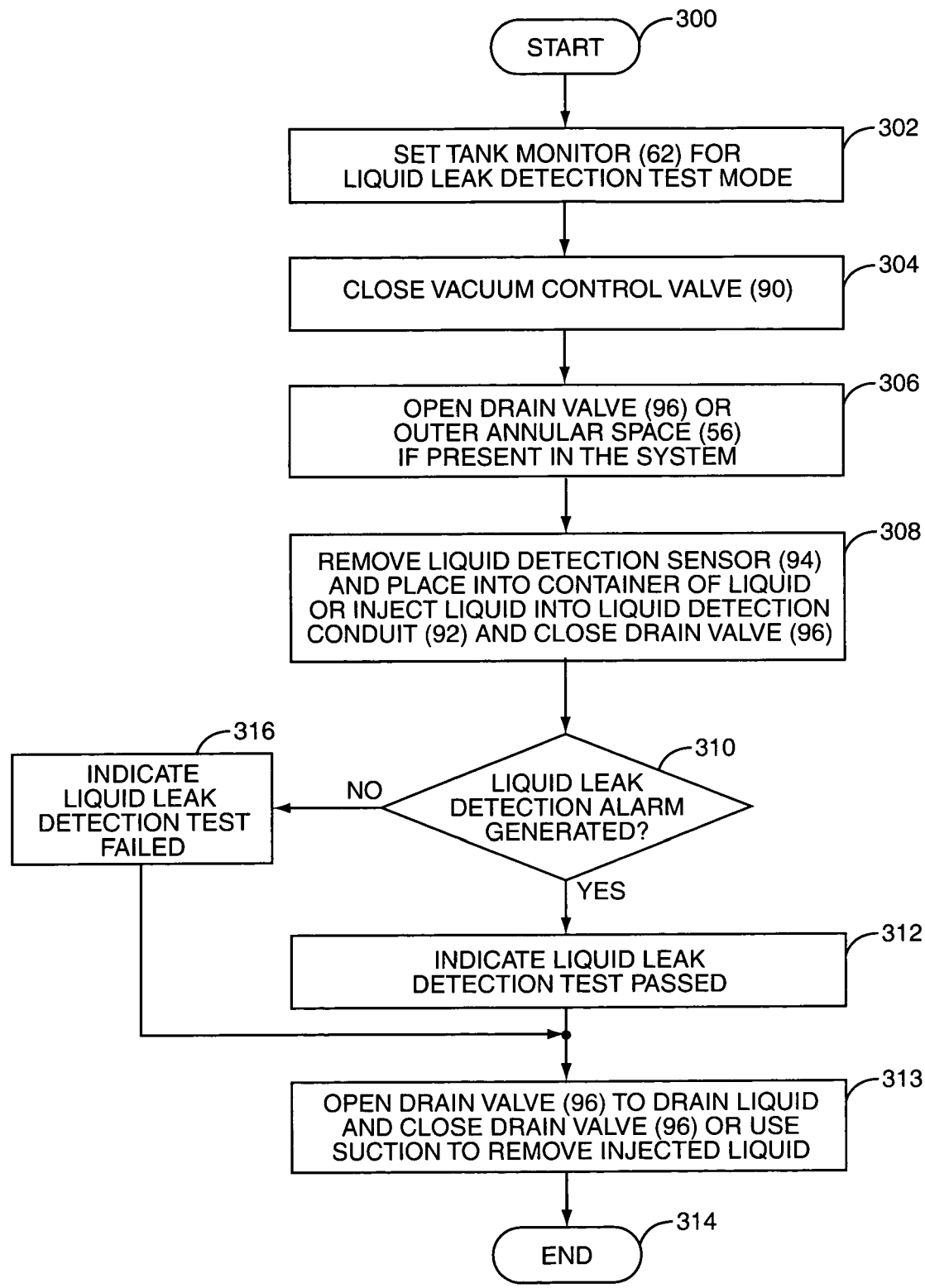
FIG. 7 is a flowchart diagram of a functional liquid leak detection test for one embodiment of the present invention that is carried out in a tank monitor test mode.

FIG. 7 illustrates a functional liquid leak detection test that can be used to determine if the liquid detection system of the present invention is operating properly. The liquid detection sensor 94 is removed from the liquid detection conduit 92 and submerged into a container of liquid (not shown). Or in an alternative embodiment, a purposeful liquid leak is injected into the liquid detection conduit 92 to determine if a liquid leak detection alarm is generated. If a liquid leak detection alarm is not generated when liquid is placed on the liquid detection sensor 94, this indicates that there has been a failure or malfunction with the liquid detection system, including possibly the liquid detection sensor 94, the sensing unit 82, and/or the tank monitor 62.

The process starts (300), and the tank monitor 62 is set to a mode for performing the functional liquid leak detection test (step 302). The vacuum control valve 90 may be closed to isolate the liquid detection conduit 92 from the STP 30 so that the vacuum level in the outer annular space 56 and sensing unit 82 is not released when the drain valve 96 is opened (step 304). Note that this is an optional step. Next, the drain valve 96, if present, or outer annular space 56 is opened in the system (step 306). The liquid detection sensor 94 is either removed and placed into a container of liquid, or liquid is inserted into the liquid detection conduit 92, and the drain valve 96 is closed (step 308). If the tank monitor 62 detects a liquid leak from the sensing unit 82 (decision 310), the tank monitor 62 registers that the functional liquid leak detection test has passed (step 312). If no liquid leak is detected (decision 310), the tank monitor 62 registers that the functional liquid leak detection test failed (step 316). After the test is conducted, if liquid was injected into the liquid detection conduit 92 as the method of subjecting the liquid detection sensor 94 to a leak, either the drain valve 96 is opened to allow the inserted liquid to drain and then closed afterwards for normal operation, or a suction device is placed into the liquid detection conduit 92 by service personnel to remove the liquid (step 313), and the process ends (step 314).

Note that although this functional liquid leak detection test requires manual intervention to open and close the drain valve 96 and to inject a liquid into the liquid detection conduit 92, this test may be automated if a drain valve 96 is provided that is capable of being opened and closed under control of the sensing unit 82 and/or tank monitor 62 and a liquid could be injected into the liquid detection conduit 92 in an automated fashion.

Figure 8:
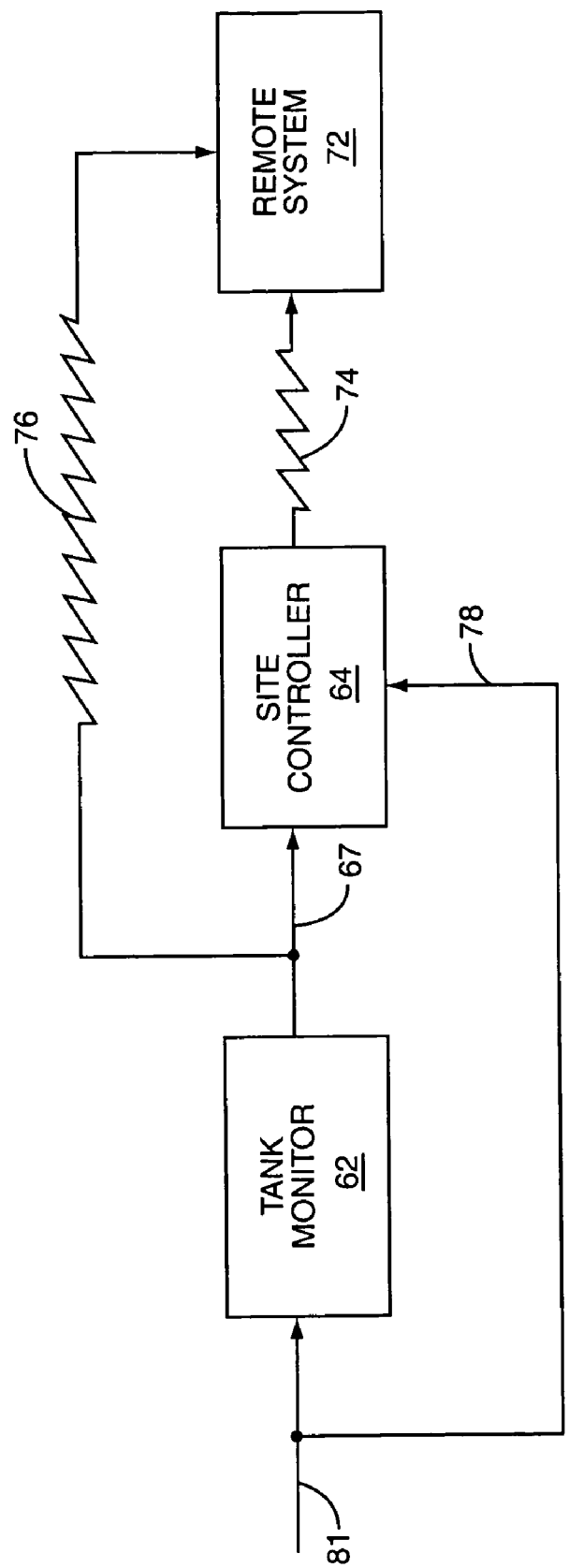
FIG. 8 is a schematic diagram of a tank monitor communication architecture.

FIG. 8 illustrates a communication system whereby leak detection alarms and other information obtained by the tank monitor 62 and/or site controller 64 from the communication line 81 may be communicated to other systems if desired. This information, such as leak detection alarms for example, may be desired to be communicated to other systems as part of a reporting and dispatching process to alert service personnel or other systems as to a possible breach or leak in the outer wall 54 of the main fuel piping conduit 48.

The tank monitor 62 that is communicatively coupled to the sensing unit 82 and other components of the present invention via the communication line 81 may be communicatively coupled to the site controller 64 via a communication line 67. The communication line 67 may be any type of electronic communication connection, including a direct wire connection, or a network connection, such as a local area network (LAN) or other bus communication. The tank monitor 62 may communicate leak detection alarms, vacuum level/pressure level information and other information from the sensing unit 82 to the site controller 64. Alternatively, the sensing unit 82 may communicate this with the site controller 64 directly via the communication line 78. The site controller 64 may be further communicatively coupled to a remote system 72 to communicate this same information to the remote system 72 from the tank monitor 62 and the site controller 64 via a remote communication line 74. The remote communication line 74 may be any type of electronic communication connection, such as a PSTN, or network connection such as the Internet, for example. The tank monitor 62 may also be directly connected to the remote system 72 using a remote communication line 76 rather than communication through the site controller 64. The site controller 64 may also be connected to the communication line 81 via communication line 78 so that the aforementioned information is obtained directly by the site controller 64 rather than through the tank monitor 62.

Note that any type of controller, control system, sensing unit controller 84, site controller 64 and remote system 72 may be used interchangeably with the tank monitor 62 as described in this application and the claims of this application.

The vacuum creation technology and sensing technology of the parent disclosures may also be applied to the riser pipe 38 and the power head 36 as will be explained with reference to FIGS. 9–13. Specifically, the parent application discloses the process for detecting leaks in the riser pipe 38. This leak detection can be done in conjunction with the leak detection of the other parent disclosures. For example, a holistic system might detect leaks in the underground storage tank 20, the riser pipe 38, the power head 36, and the main fuel piping conduit 48. Specifically, a vacuum may be created by the vacuum siphon of the power head 36 and applied to some or all of these regions. Then, the leak detection algorithms of FIGS. 4A–7 may be applied to these regions so that leaks may be detected. This arrangement may help comply with new regulations being imposed on fueling environments. Even if this arrangement is not required by regulation or statute, fueling environment operators may wish to install such systems to increase the likelihood of detecting a leak to minimize environmental damage and/or prevent loss of inventory.

Figure 9:
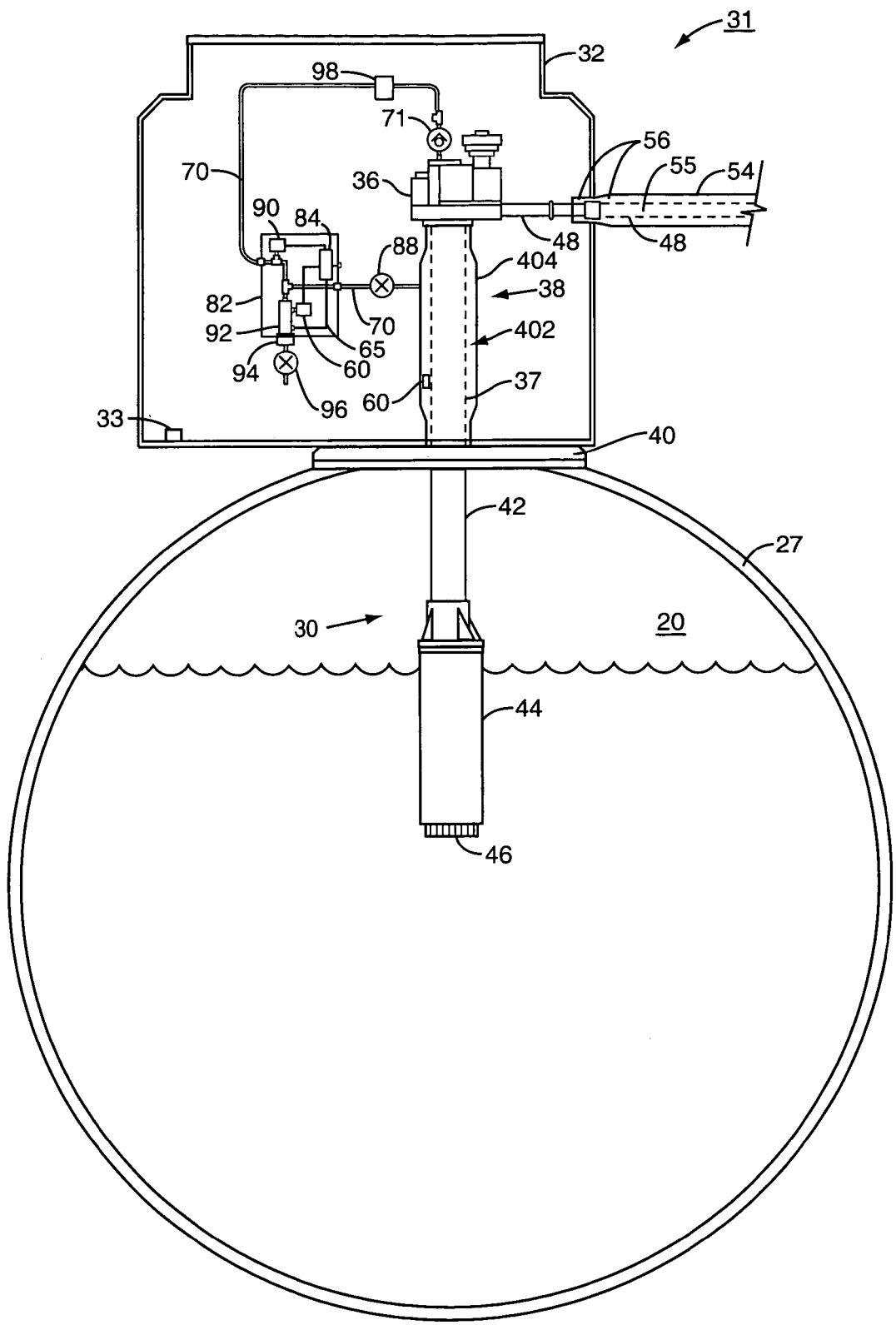
FIG. 9 illustrates an exemplary embodiment of the double-walled riser pipe.

Turning to FIG. 9, the sump 31 is illustrated. As explained above, the power housing 36 sits atop the riper pipe 38. While FIG. 9 shows the riser pipe 38 completely contained within the sump 31, it is possible that a portion of the riser pipe 38 may be external to the sump 31 as is illustrated in FIG. 3. In the embodiment of FIG. 9, the riser pipe 38 has an interior column pipe 37, an interstitial space 402, and an exterior wall 404. A pressure sensor 60 may be positioned within the interstitial space 402. Further, the vacuum tubing 70 may be connected to the interstitial space 402 through the sensing unit 82 or directly as needed or desired. If the sensing unit 82 is used, then it is possible to omit the pressure sensor 60 within the interstitial space 402. As illustrated, the exterior wall 404 is crimped at each end of the riser pipe 38 so that the interstitial space 402 is isolated from other interstitial spaces such as areas 27 and 56. While crimping is one specifically contemplated treatment for the end of the riser pipe 38, other sealing treatments may also be used and still be within the scope of the present invention. Such seals can be made by welding, potting, and the like as is well understood in the industry. By isolating interstitial space 402 in this manner, the pressure sensor 60 may detect a leak within the confines of interstitial space 402 independently of leaks in other interstitial spaces 27 and 56. It should be appreciated that the processes of detecting the leak described with reference to FIGS. 2–8 would be used to detect the leak in interstitial space 402.

Figure 10:
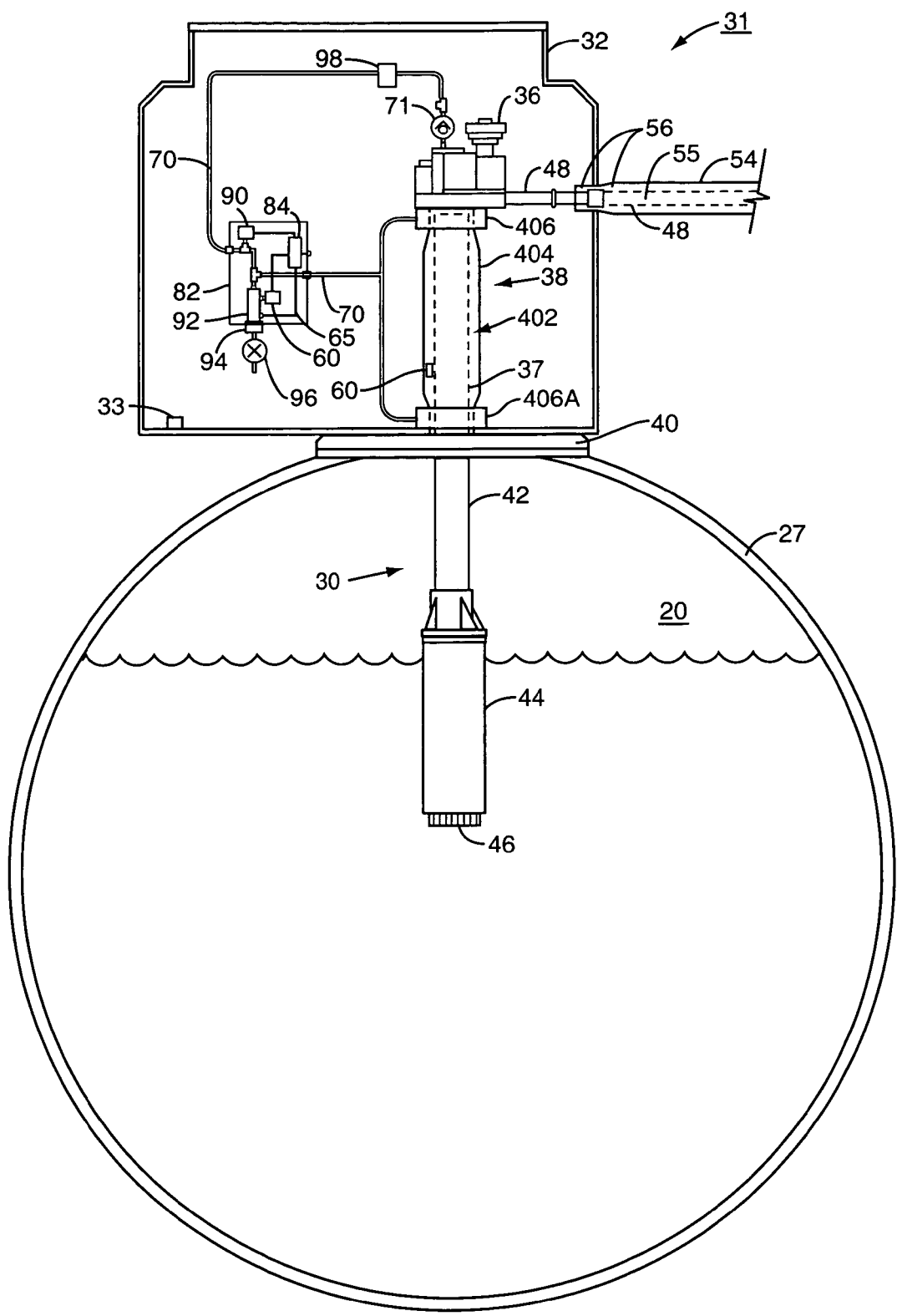
FIG. 10 illustrates a second embodiment of the double-walled riser pipe wherein the vacuum and sensing are introduced to the interstitial space at the fittings.

In contrast to the embodiment of FIG. 9, wherein the vacuum tubing 70 fluidly connects to the interstitial space 402 through the exterior wall 404, FIG. 10 illustrates that the vacuum tubing 70 may alternatively connect to the interstitial space 402 through a fitting 406 or 406A (or both) positioned at either end of the riser pipe 38. The use of a fitting 406 or 406A allows the vacuum tubing to 70 to connect to the interstitial space 402 without creating a breach in exterior wall 404. This further precludes the necessity for custom made riser pipes 38 with specialized elements that allow the vacuum tubing 70 to be connected thereto. Two embodiments of exemplary fittings are explained below in FIGS. 14 and 15. A brief summary is provided here for convenience. The fittings described in this application contemplate a number of different options. In one embodiment, the fitting allows the connection of the interstitial space 402 to the vacuum tubing 70. Additionally, the fitting has threads that are adapted to be threaded into a complementary element such as the power head 36. The fitting lies flush against the element, and may capture any leaks through the threads and convey these leaks to the interstitial space 402.

Figure 11:
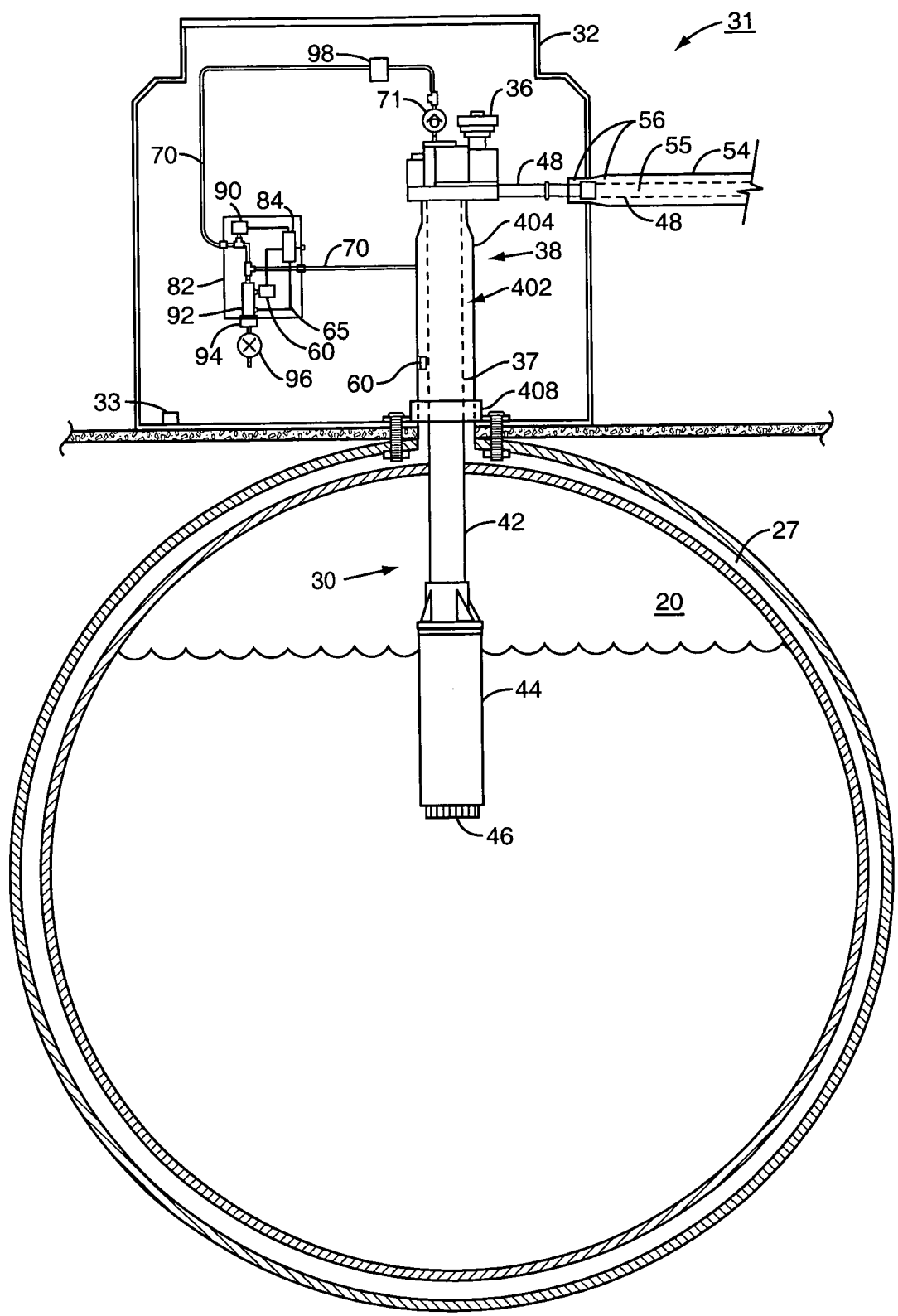
FIG. 11 illustrates a third embodiment of the double-walled riser pipe wherein the interstitial space of the double-walled riser pipe is fluidly connected to the interstitial space of the underground storage tank.

A third embodiment of the leak detection system of the parent application is illustrated in FIG. 11 wherein the interstitial space 402 is fluidly connected to the interstitial space 27 of the underground storage tank 20. Specifically, the interstitial spaces 27 and 402 are connected through the fitting 408, which is designed to allow fluid communication therethrough. The vacuum tubing 70 is connected to the interstitial space 402 through the exterior wall 404, through the fitting 408 (not shown, but suggested by fitting 406 in FIG. 10), or could alternatively be connected to the interstitial space 27 as explained in the previously incorporated related application Ser. No. 10/390,346. Pressure sensors 60 may be positioned in the interstitial space 402 or in the sensing unit 82 as needed or desired. It should be appreciated that the processes of detecting the leak described with reference to FIGS. 2–8 would be used to detect the leak in interstitial space 402. This embodiment allows a single pressure sensor 60 or sensing unit 82 to detect a leak in interstitial spaces 27 and 402. This may allow equipment costs to be reduced, albeit at the expense of resolution. Specifically, if these interstitial spaces 27 and 402 are fluidly connected, it may be difficult to determine if a detected leak is in the interstitial space 27 or the interstitial space 402 without a visual inspection.

Figure 12:
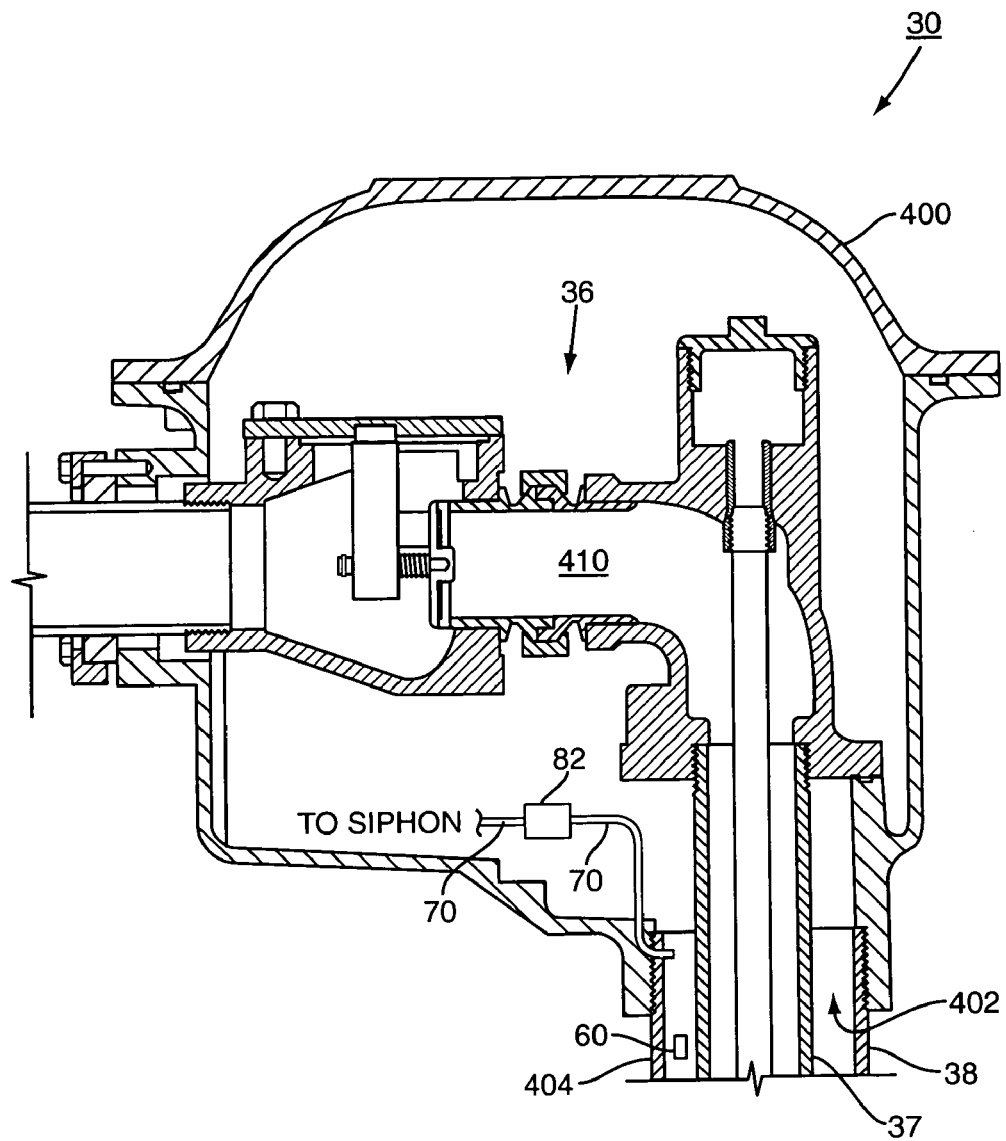
FIG. 12 illustrates a fourth embodiment of the double-walled riser pipe wherein the interstitial space of the double-walled riser pipe is fluidly connected to a casing of the power head.

As yet another alternative, the interstitial space 402 of FIG. 12 may extend into a casing 400 for the power head 36. Note that the casing 400 corresponds closely to the casing body described in the previously incorporated '765 patent (labeled casing body 12, with cover 22 in the '765 patent). In this embodiment, the vacuum tubing 70 may be located entirely within the casing 400. The sensing unit 82 may likewise be positioned within the casing 400 and connected to the vacuum siphon of the power head 36 via the vacuum tubing 70. In this embodiment, it is possible that the exterior wall 404 may be threaded into a complementary threaded portion of the power head 36, while the column pipe 37 extends into the fuel flow area 410 of the power head 36. It should be appreciated that the processes of detecting the leak described with reference to FIGS. 2–8 would be used to detect the leak in interstitial space 402. This embodiment allows a single sensor 60 or sensing unit 82 to detect leaks in the interstitial space 402 and the interior of the casing 400. This may allow equipment costs to be reduced, albeit at the expense of resolution. Specifically, if these interstitial spaces are fluidly connected, it may be difficult to determine if a detected leak is in the interstitial space 402 or within the casing 400.

Figure 13:
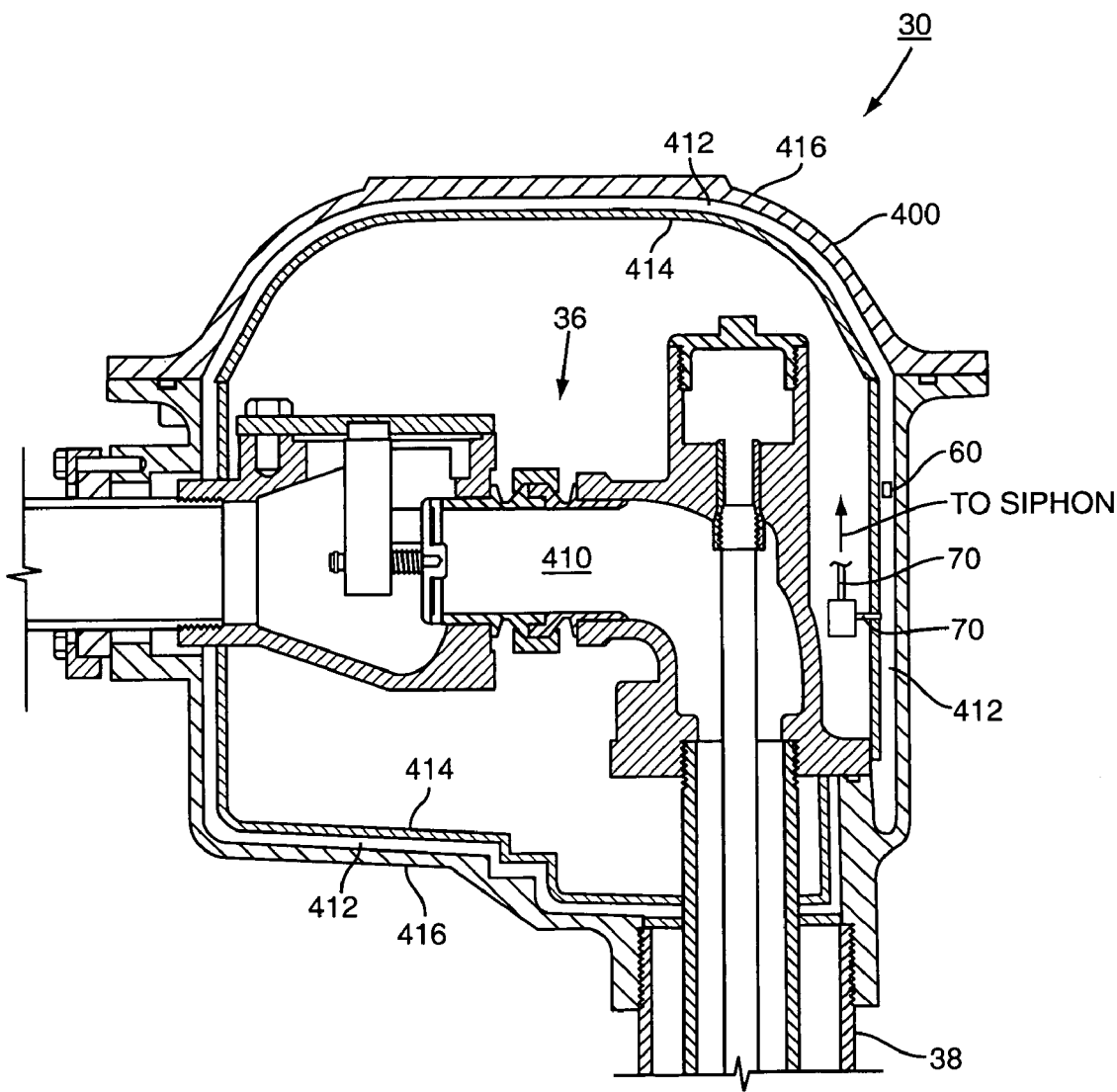
FIG. 13 illustrates an alternate embodiment of the present invention wherein the casing of the power head includes a double-wall, and the interstitial space thereof is subjected to the vacuum and sensing of the present invention.

Another variation of the present invention is illustrated in FIG. 13, wherein the casing 400 has an interstitial space 412 delimited by interior wall 414 and exterior wall 416. A pressure sensor 60 may be positioned in the interstitial space 412, and the interstitial space 412 may be connected to the vacuum-creating siphon of the power head 36 through vacuum tubing 70 as previously explained. It should be appreciated that the processes of detecting the leak described with reference to FIGS. 2–8 would be used to detect the leak in interstitial space 412. This embodiment allows a sensor 60 or sensing unit 82 to detect leaks in the casing 400 or in the power head 36. This may help comply with environmental regulations or minimize environmental damage. Further, this embodiment helps provide complete double-walled protection for every element within the fueling environment.

Figure 14:
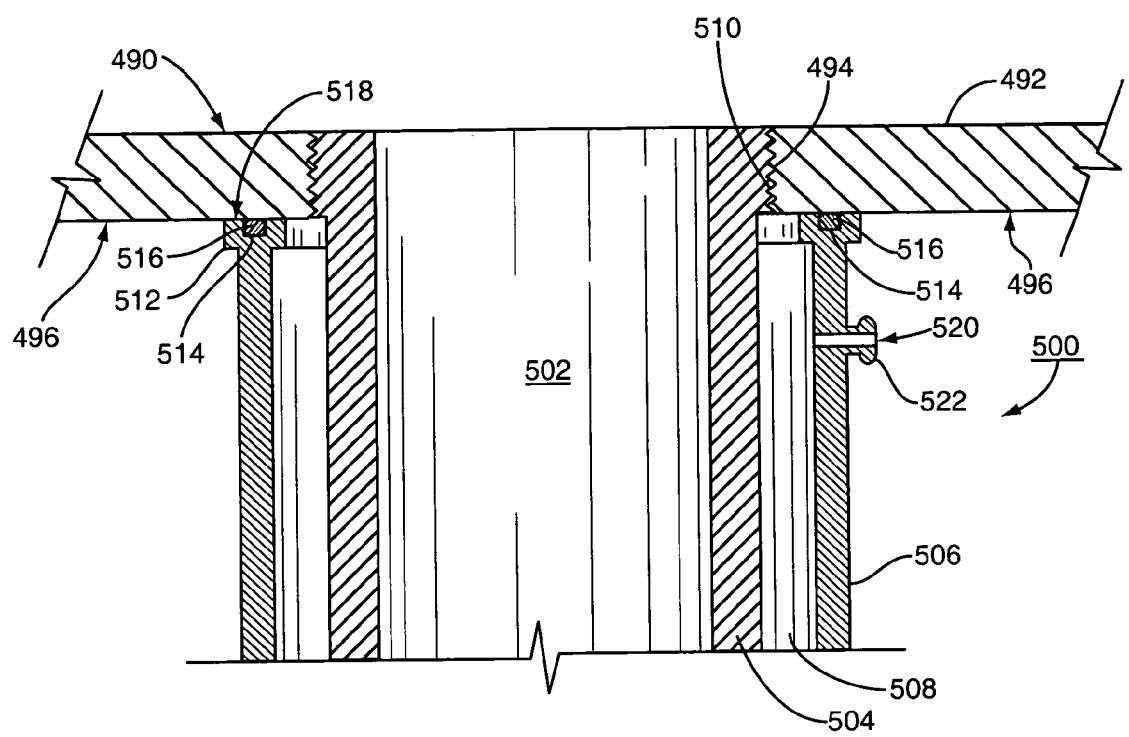
FIG. 14 illustrates a first embodiment of a pipe fitting.
Figure 15:
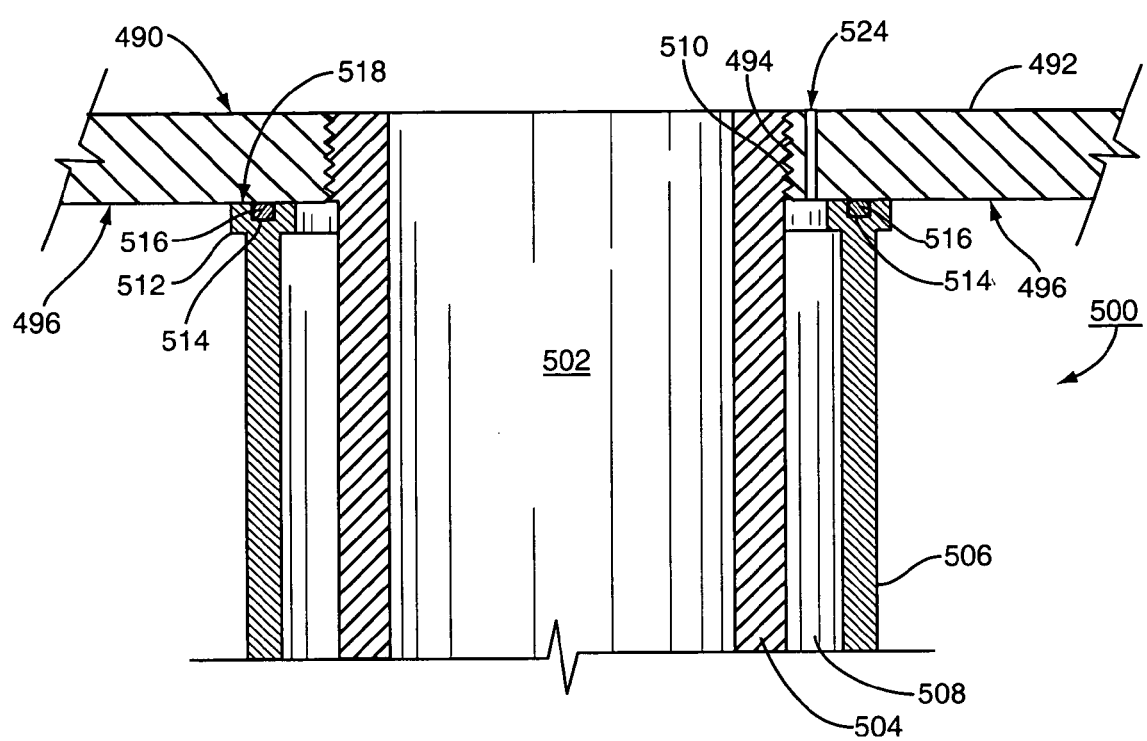
FIG. 15 illustrates a second embodiment of a pipe fitting.

Turning now to FIGS. 14 and 15, two embodiments of the fitting 406 are shown. Double-walled piping, which may be the riser pipe 38, the main fuel piping conduit 48, or the like, is fluidly connected to a receptacle 490, such as the power head 36, the sump 31, or the like. To help effectuate this connection, a fitting 500 is secured to the end of the double-walled piping. The fitting 500 may be secured to the double-walled piping with glue, crimping, welding, threaded elements, or the like, as is well understood in the industry. Fitting 500 includes an interior space 502 through which fuel flows. Interior space 502 is delimited by interior wall 504. Interior wall 504 is surrounded by outer wall 506. Interstitial space 508 is fluidly connected to the interstitial space of the double-walled piping.

Interior wall 504 has threads 510 on a terminal end thereof. In the exemplary embodiment, the threads 510 are male threads adapted to be received by complementary female threads 494 in the wall 492 of the receptacle 490.

Outer wall 506 has a flange 512 on a terminal end thereof. Flange 512 has a groove 514 that is adapted to receive an O-ring 516 therein. An upper surface 518 of flange 512 lies flush with an exterior surface 496 of the wall 492, and O-ring 516 causes a seal to be formed between the receptacle 490 and the fitting 500. By forming this seal, any fluid that leaks through the threads 510 and 494 is captured in interstitial space 508.

A fluid channel 520 is delimited by outer wall 506 and protuberance 522. Vacuum tubing (not shown, but, for example, vacuum tubing 70) may be snap-fit over or otherwise connected to protuberance 522. Vacuum tubing may then be connected to a vacuum source, such as the siphon area of the STP, or the vacuum tubing may be connected to another interstitial space that is already under vacuum. This connection to an interstitial space already under vacuum will create a vacuum in interstitial space 508 for monitoring or other purposes as needed or desired. In this manner, the interstitial space 508 can be monitored up to the point of the threads 510 of the fitting 500 rather than only up to the point of the connection between the fitting 500 and the double-walled piping. Further, the fluid channel 520 can be provided at the fitting 500 instead of in the double-walled piping.

An alternate embodiment for the fitting 500 is illustrated in FIG. 15. Instead of the protuberance 522 and channel 520, the embodiment of FIG. 15 has a channel 524 that extends through the wall 492 of the receptacle 490. In this manner, the interstitial space 508 is extended through the fitting 500 to the receptacle 490 so that a vacuum source within the receptacle 490 can be used to generate a vacuum in the interstitial space 508. An example would be an STP generating a vacuum in a riser pipe. Alternatively, if the interstitial space 508 is already under a vacuum, the channel 524 can be used to create a vacuum within the receptacle 490. Other variations of fittings are also possible.

Figure 16:
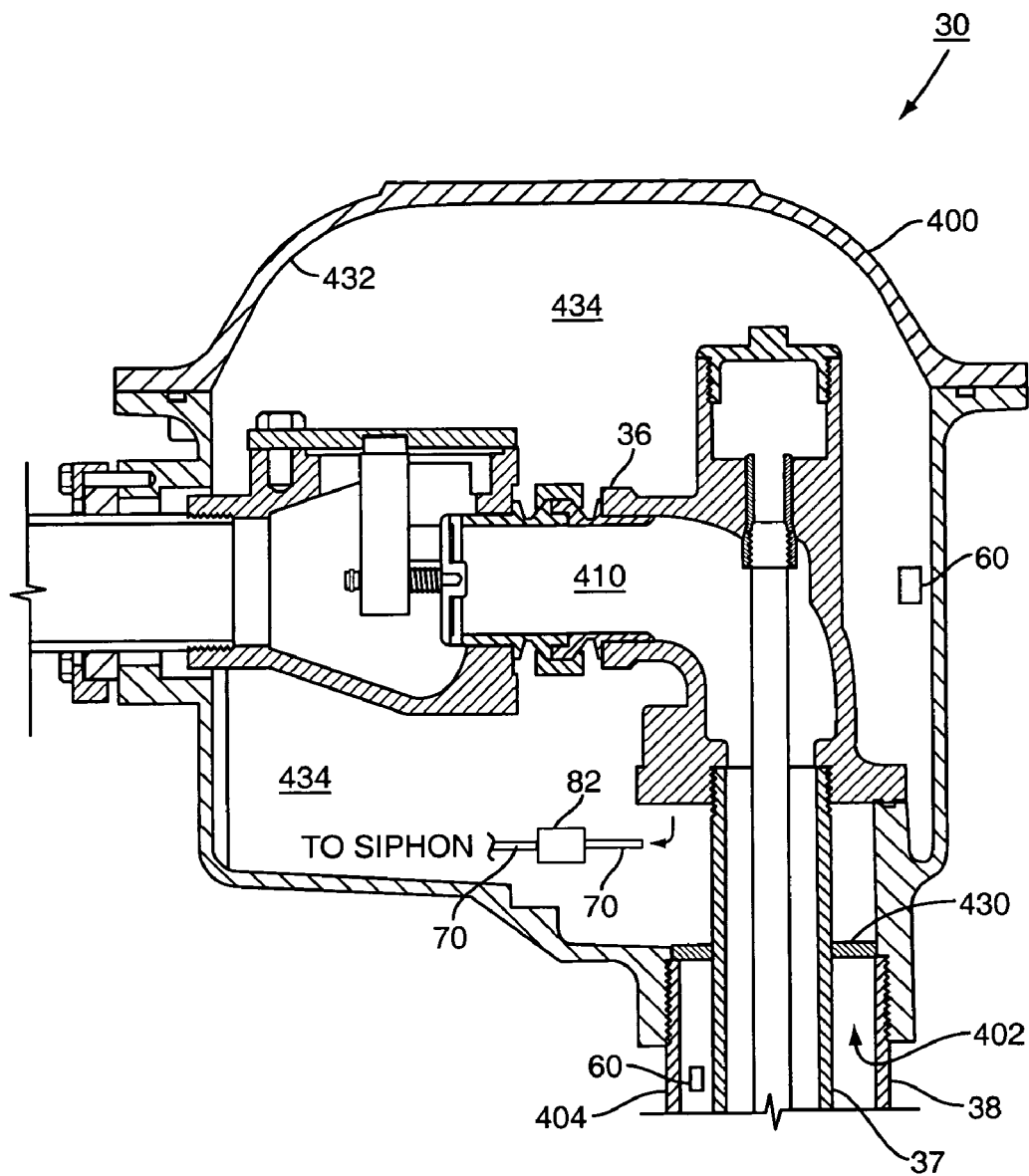
FIG. 16 illustrates an embodiment of the power head within a casing and a leak detection system associated therewith.

The present invention builds on the teachings of the parent applications by monitoring the interior space of the casing 400. While the parent applications disclosed monitoring the interior space of the casing 400 in conjunction with the interstitial space 402 of the riser pipe 38, the present invention monitors the interior space alone. This provides greater leak detection resolution and may be done to insure that the casing 400 is not leaking or that the power head 36 is not leaking. As described in the incorporated '765 patent, the casing 400 is fluid tight. The present invention is illustrated in FIG. 16.

Specifically, the casing 400 encloses the power head 36 and is isolated from the interstitial space 402 of the riser pipe 38 via a cap 430 positioned on the bottom of the casing 400. The space between the inner surface 432 of casing 400 and the power head 36 is the interior space 434 of the casing 400. Vacuum tubing 70 terminates within the interior space 434 and is connected to the siphon line within the power head 36 as previously described. Alternatively, the vacuum tubing 70 may be connected to the turbine pump within the boom 42 as previously described. In either case, a vacuum is created in the interior space 434.

A pressure sensor 60 may be positioned in the interior space 434 so that pressure levels of the interior space 434 may be measured. Alternatively, the sensing unit 82 may be associated with the vacuum tubing 70 as previously discussed. Once the vacuum is established within the casing 400, the processes of detecting the leak described with reference to FIGS. 2–8 would be used to detect the leak in interior space 434.

It is possible that this arrangement may eliminate the need for the sump 31 or provide additional leak detection and alarm generation so that the leaks may be detected in a timely fashion with the resolution required to isolate the leak. Armed with this information, the leaks may be corrected before any environmental damage is sustained and so all regulatory and statutory rules are followed by the fueling environments.

The following paragraph shows the siphon valve of the previously incorporated '765 patent. In particular, the following paragraph represents a quotation of col. 6, lines 26–50 of the '765 patent. A few liberties have been taken with the numbering to make the numbering from the '765 patent consistent with the numbering of the present disclosure, but the disclosure remains the same.

Figure 17:
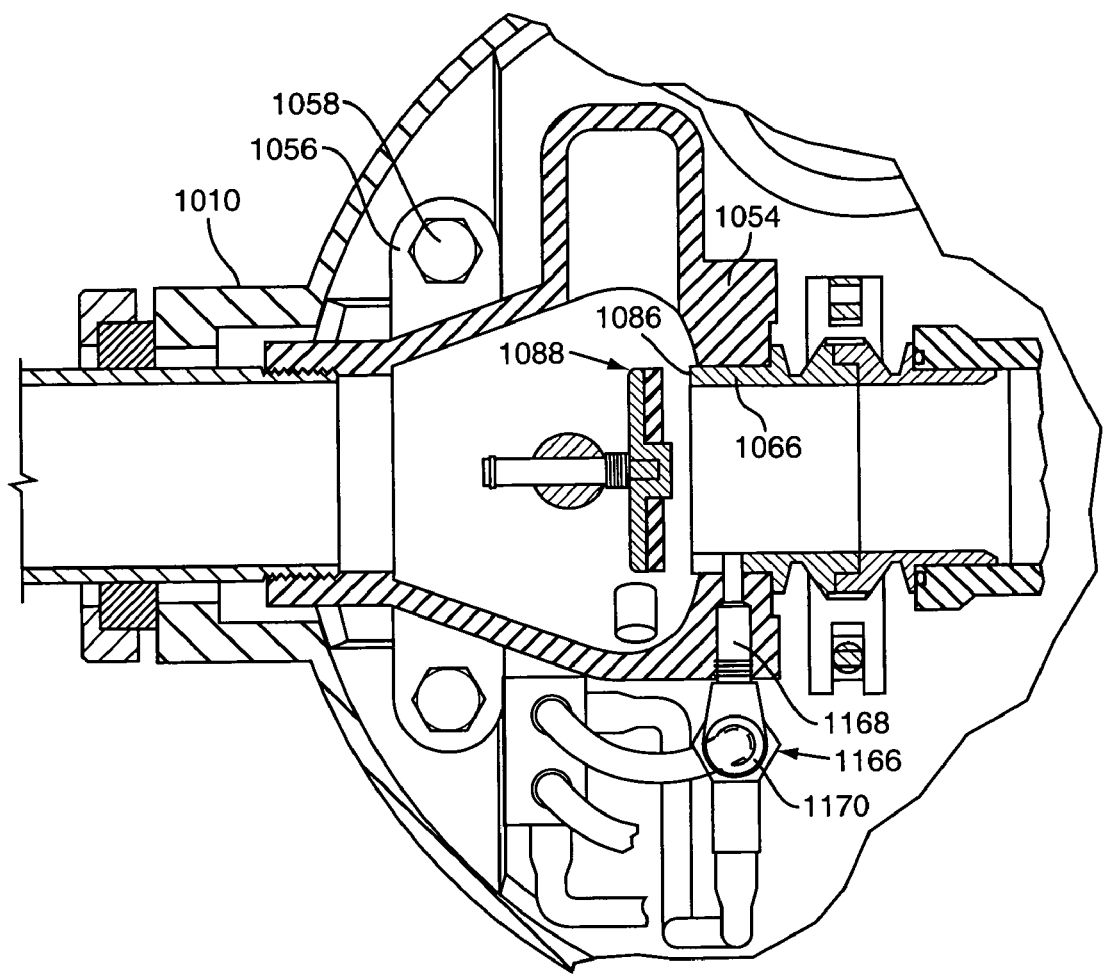
FIG. 17 illustrates an interior portion of the power head.
Figure 18:
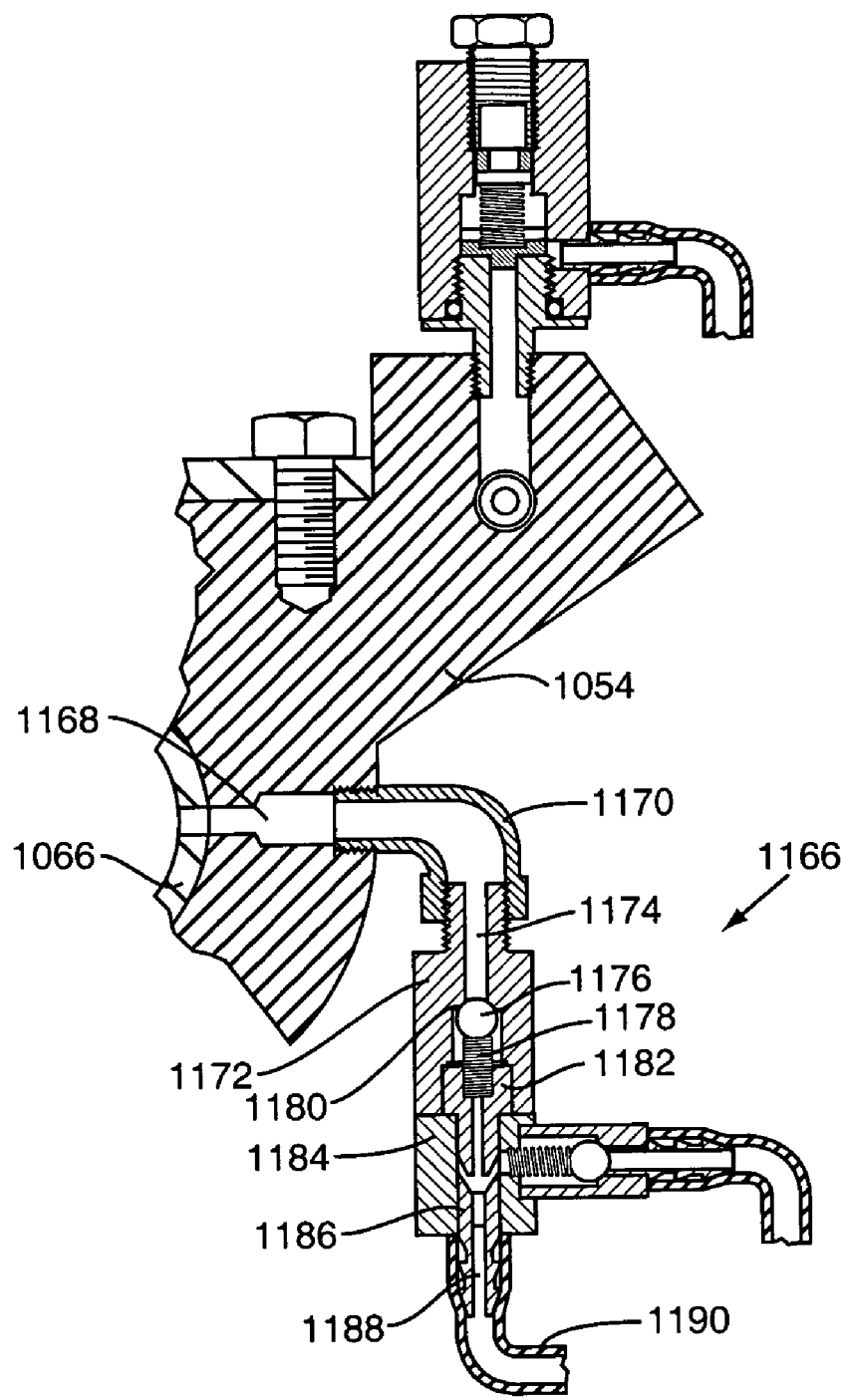
FIG. 18 illustrates a siphon valve with a venture within the power head.

A siphon valve which is generally identified by 1166 and is shown in FIGS. 17 and 18 serves as a vacuum generator for a siphon system that may be used in connection with the casing 1010. A passage 1168 is formed through the body of the check valve housing 1054 and through the coupling 1066. Accordingly, the passage 1168 connects with the fuel flow path at a location upstream from the check valve seat 1086 and the check valve 1088 (see FIG. 17 in particular). An elbow fitting 1170 is threaded into the outer end of the passage 1168. The siphon valve 1168 has a body 1172 which is threaded at its upper end into the lower end of the elbow 1170. The valve body 1172 has a central passage 1174 which connects with the interior of the elbow fitting 1170. A check valve located in the valve body 1172 includes a ball 1176 which is continuously urged by a compression spring 1178 upwardly against a valve seat 1180. When the ball 1176 is against the seat 1180, the passage 1174 is closed. The lower end of the spring 1178 acts against a nozzle 1182 which is fitted into the lower end of the valve body 1172. The lower end of the nozzle 1182 is received in a fitting 1184 having a venturi 1186 secured in its lower portion. The venturi 1186 has a venturi passage 1188 which is relatively narrow on its upstream side and which gradually flares towards its lower or downstream end. A tube 1190 is secured to the lower end portion of the venturi 1186.

As used herein, the term "vacuum generating means" includes the siphon line within the power head 36 and the vacuum generated by the pump within boom 42. Also, structural equivalents of these elements are meant to be included in the term.

The various embodiments presented herein allow for double-walled containment to be positioned in virtually every location within the fueling environment. Further, the present invention teaches a method of leak detection for each of these situations so as to avoid contaminating the environment with leaking fuel.

Those skilled in the art will recognize improvements and modifications to the preferred embodiments of the present invention. All such improvements and modifications are considered within the scope of the concepts disclosed herein and the claims that follow.

What is claimed is:

1. A system for detecting a leak, comprising:
   a submersible turbine pump adapted to draw fuel from an underground storage tank for delivery to a fuel dispenser, said submersible turbine pump comprising:
      a power head containing a fuel flow area that receives the fuel from the underground storage tank for delivery to the fuel dispenser; and
      a vacuum source;
   a casing surrounding said power head, said casing comprising an interior space, said vacuum source fluidly connected to said interior space such that a vacuum is generated in said interior space; and
   a pressure sensor coupled to said interior space to measure a vacuum level in the interior space.

2. The system of claim 1, wherein said vacuum source comprises a siphon line generated by a venturi within said power head.

3. The system of claim 1, wherein said vacuum source comprises a turbine pump positioned within a boom.

4. The system of claim 1, wherein said pressure sensor is positioned in said interior space.

5. The system of claim 1, further comprising vacuum tubing, said pressure sensor coupled to said vacuum tubing.

6. The system of claim 5, further comprising a check valve located in said vacuum tubing.

7. The system of claim 6, wherein said check valve lies between said power head and a sensing unit to prevent ingress of fluid from the interior space to said power head.

8. The system of claim 5, wherein said vacuum tubing is positioned within the casing.

9. The system of claim 5, wherein the vacuum tubing is coupled to the vacuum source.

10. The system of claim 1, further comprising a sensing unit controller coupled to the pressure sensor to determine the vacuum level in said interior space.

11. The system of claim 10, wherein the sensing unit controller is coupled to a control system.

12. The system of claim 1, further comprising a control system that is electrically coupled to said submersible turbine pump wherein said submersible turbine pump creates a defined initial threshold vacuum level in the interior space after receiving a test initiation signal from said tank monitor.

13. The system of claim 12, wherein said control system generates a leak detection alarm if said submersible turbine pump cannot create said defined initial threshold vacuum level in the interior space.

14. The system of claim 12, wherein the control system is a system comprised from the group consisting of a sensing unit controller, a tank monitor, a site controller, and a remote system.

15. The system of claim 1, further comprising a control system that is electrically coupled to said submersible turbine pump, wherein said control system is electrically coupled to said pressure sensor to receive the vacuum level in the interior space.

16. The system of claim 15, wherein said control system determines if the vacuum level in the interior space has decayed to a threshold vacuum level from a defined initial threshold vacuum level.

17. The system of claim 16, wherein said control system activates said submersible turbine pump to attempt to lower the vacuum level in the interior space back down to said defined initial threshold vacuum level if the vacuum level in the interior space decays to said threshold vacuum level.

18. The system of claim 17, wherein said control system determines if the vacuum level in the interior space lowers to said defined initial threshold vacuum level within a defined amount of time.

19. The system of claim 18, wherein said control system generates a leak detection alarm if said control system determines that the vacuum level in the interior space does not lower to said defined initial threshold vacuum level within said defined amount of time.

20. The system of claim 15, wherein said control system determines if a leak exists in the interior space by determining if the vacuum level in the interior space decays to a threshold vacuum level in a predetermined amount of time.

21. The system of claim 15, further comprising a liquid detection sensor that is coupled to the interior space, wherein said liquid detection sensor detects if liquid is present in the interior space.

22. The system of claim 21, wherein said liquid detection sensor comprises a float.

23. The system of claim 15, wherein the control system is a system comprised from the group consisting of a sensing unit controller, a tank monitor, a site controller, and a remote system.

24. The system of claim 1, wherein said casing is fluid tight.

* * * * *

UNITED STATES PATENT AND TRADEMARK OFFICE
CERTIFICATE OF CORRECTION

PATENT NO. : 7,010,961 B2
DATED : March 14, 2006
INVENTOR(S) : Ray J. Hutchinson et al.

It is certified that error appears in the above-identified patent and that said Letters Patent is hereby corrected as shown below:

<u>Column 18,</u>
Line 45, change "tank monitor" to -- control system --.

Signed and Sealed this

Twenty-third Day of May, 2006

JON W. DUDAS
*Director of the United States Patent and Trademark Office*